US012586582B2

(12) United States Patent
Um et al.

(10) Patent No.: US 12,586,582 B2
(45) Date of Patent: Mar. 24, 2026

(54) APPARATUS PERFORMING BASED ON VOICE RECOGNITION AND ARTIFICIAL INTELLIGENCE AND METHOD FOR CONTROLLING THEREOF

(71) Applicant: SAMSUNG ELECTRONICS CO., LTD., Suwon-si (KR)

(72) Inventors: Taekwang Um, Suwon-si (KR); Heeyoung Chung, Suwon-si (KR); Kyungtae Kim, Suwon-si (KR); Junesig Sung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 96 days.

(21) Appl. No.: 18/378,371

(22) Filed: Oct. 10, 2023

(65) Prior Publication Data

US 2024/0112676 A1      Apr. 4, 2024

Related U.S. Application Data

(63) Continuation of application No. PCT/KR2023/014692, filed on Sep. 25, 2023.

(30) Foreign Application Priority Data

Sep. 30, 2022      (KR) ........................ 10-2022-0125691
Nov. 1, 2022      (KR) ........................ 10-2022-0143902

(51) Int. Cl.
    *G10L 15/22*          (2006.01)
    *G10L 15/18*          (2013.01)
            (Continued)

(52) U.S. Cl.
    CPC .......... *G10L 15/22* (2013.01); *G10L 15/1815* (2013.01); *G10L 15/20* (2013.01); *G10L 25/63* (2013.01)

(58) Field of Classification Search
    CPC ..... G10L 15/22; G10L 15/1815; G10L 15/20; G10L 25/63; G10L 13/033; G06F 3/16; G06F 3/167
            (Continued)

(56) References Cited

U.S. PATENT DOCUMENTS 6,567,787 B1 *    5/2003    Walker .................... G07F 9/026
                                                                    705/16
10,395,659 B2      8/2019    Piercy et al.
            (Continued)

FOREIGN PATENT DOCUMENTS

CN          112581935  A      3/2021
JP          10-326176  A      12/1998
            (Continued)

OTHER PUBLICATIONS

International Search Report (PCT/ISA/210) issued on Jan. 8, 2024 by the International Searching Authority in International Patent Application No. PCT/KR2023/014692.
            (Continued)

*Primary Examiner* — Abul K Azad
(74) *Attorney, Agent, or Firm* — Sughrue Mion, PLLC

(57)          ABSTRACT

An electronic device includes: a microphone; a speaker; a memory configured to store parameter information; and a processor configured to: perform speech recognition of a user's speech received by the microphone, control the speaker to output a first response message based on the speech recognition of the user's speech, detect a re-request for the first response message, recognize a text of the first response message, determine a second response message and a first speech signal based on a first parameter corresponding to the text, and generate the second response message comprising the determined first speech signal.

20 Claims, 10 Drawing Sheets

700

WHEN USER'S UTTERED SPEECH IS DETECTED THROUGH MICROPHONE, PERFORM SPEECH RECOGNITION OF USER'S UTTERED SPEECH AND OUTPUT FIRST RESPONSE MESSAGE CORRESPONDING TO RESULT OF SPEECH RECOGNITION ~710

DETECT REQUEST TO RE-OUTPUT FIRST RESPONSE MESSAGE IN SPEECH RECOGNITION RESULT ~720

DETERMINE AT LEAST ONE WORD, WHICH IS TO BE INCLUDED IN SECOND RESPONSE MESSAGE, BASED ON AT LEAST ONE PARAMETER CORRESPONDING TO AT LEAST ONE WORD CONSTITUTING FIRST RESPONSE MESSAGE ~730

GENERATE SECOND RESPONSE MESSAGE INCLUDING EMPHASIS TONE FOR AT LEAST ONE DETERMINED WORD ~740

(51) Int. Cl.
   *G10L 15/20*          (2006.01)
   *G10L 25/63*          (2013.01)
(58) Field of Classification Search
   USPC ......................................................... 704/275
   See application file for complete search history.

(56)                References Cited

U.S. PATENT DOCUMENTS

| | | | |
|---|---|---|---|
| 11,170,763 B2 | 11/2021 | Watanabe et al. | |
| 11,239,811 B2 | 2/2022 | Knode | |
| 11,367,431 B2 | 6/2022 | Bonafonte et al. | |
| 11,393,477 B2 | 7/2022 | Mahmood et al. | |
| 12,087,284 B1 | 9/2024 | Lezzoum et al. | |
| 12,154,563 B2 | 11/2024 | Jeong et al. | |
| 2005/0154591 A1* | 7/2005 | Lecoeuche | G10L 15/30 |
| | | | 704/E15.047 |
| 2006/0190267 A1* | 8/2006 | Chan | G04G 21/06 |
| | | | 704/275 |
| 2014/0188486 A1* | 7/2014 | You | G10L 21/16 |
| | | | 704/275 |
| 2019/0371302 A1 | 12/2019 | Watanabe et al. | |
| 2019/0371305 A1 | 12/2019 | Watanabe et al. | |
| 2022/0020369 A1 | 1/2022 | Miyazaki et al. | |
| 2022/0322015 A1 | 10/2022 | Song | |
| 2023/0102049 A1 | 3/2023 | Oh | |

FOREIGN PATENT DOCUMENTS

| | | |
|---|---|---|
| JP | 2000-339314 A | 12/2000 |
| JP | 2019-211515 A | 12/2019 |
| JP | 2019-211516 A | 12/2019 |
| KR | 10-2021-0053512 A | 5/2021 |
| KR | 10-2427748 B1 | 8/2022 |
| WO | 2022/054978 A1 | 3/2022 |
| WO | 2022/059911 A1 | 3/2022 |

OTHER PUBLICATIONS

Written Opinion (PCT/ISA/237) issued on Jan. 8, 2024 by the International Searching Authority in International Patent Application No. PCT/KR2023/014692.
Communication dated Jul. 7, 2025 issued by the European Patent Office in European Patent Application No. 23873037.8.

* cited by examiner

FIG. 7

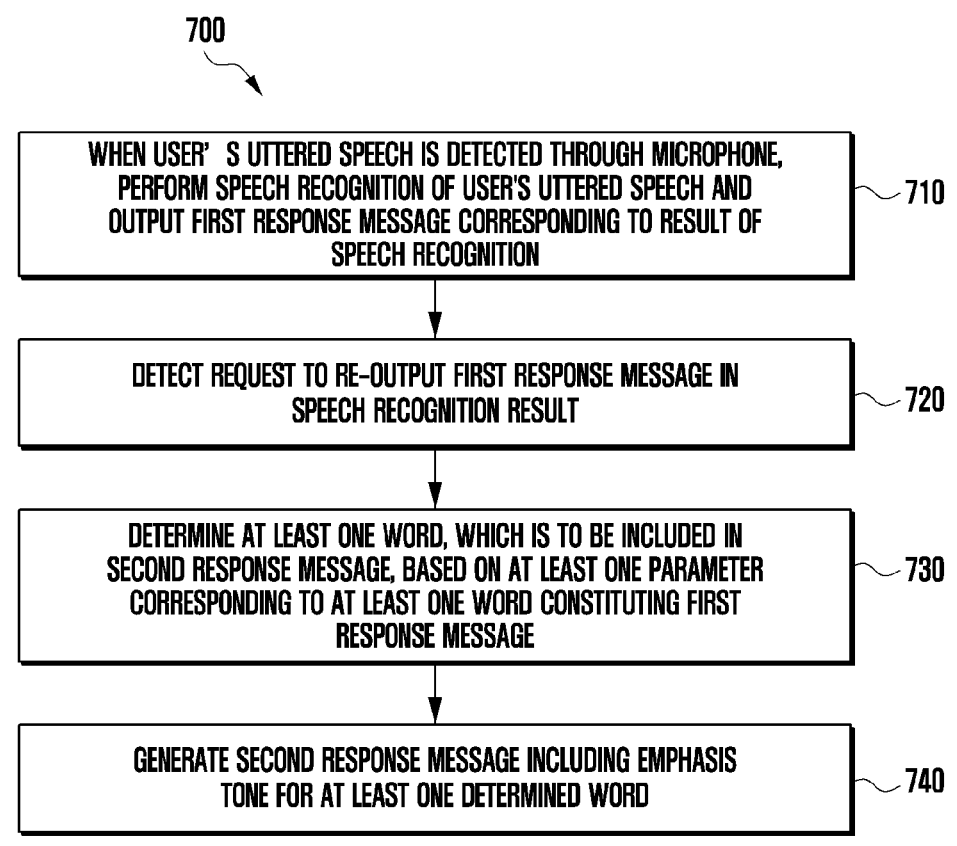

700

WHEN USER' S UTTERED SPEECH IS DETECTED THROUGH MICROPHONE, PERFORM SPEECH RECOGNITION OF USER'S UTTERED SPEECH AND OUTPUT FIRST RESPONSE MESSAGE CORRESPONDING TO RESULT OF SPEECH RECOGNITION — 710

DETECT REQUEST TO RE-OUTPUT FIRST RESPONSE MESSAGE IN SPEECH RECOGNITION RESULT — 720

DETERMINE AT LEAST ONE WORD, WHICH IS TO BE INCLUDED IN SECOND RESPONSE MESSAGE, BASED ON AT LEAST ONE PARAMETER CORRESPONDING TO AT LEAST ONE WORD CONSTITUTING FIRST RESPONSE MESSAGE — 730

GENERATE SECOND RESPONSE MESSAGE INCLUDING EMPHASIS TONE FOR AT LEAST ONE DETERMINED WORD — 740

APPARATUS PERFORMING BASED ON VOICE RECOGNITION AND ARTIFICIAL INTELLIGENCE AND METHOD FOR CONTROLLING THEREOF

CROSS-REFERENCE TO RELATED APPLICATIONS

This application is a by-pass continuation application of International Application No. PCT/KR2023/014692, filed on Sep. 25, 2023, which is based on and claims priority to Korean Patent Application Nos. 10-2022-0125691, filed on Sep. 30, 2022 and 10-2022-0143902, filed on Nov. 1, 2022, in the Korean Intellectual Property Office, the disclosures of which are incorporated by reference herein their entireties.

BACKGROUND

1. Field

The disclosure relates to an electronic device (e.g., an intelligent agent) operating based on artificial intelligence and speech recognition and a method for controlling the same.

2. Description of Related Art

With recent development of speech recognition technology, a speech recognition function may be implemented in various electronic devices having a speech input device (e.g., a microphone). For example, through a speech recognition function, the electronic device may recognize speech uttered by a user and execute a specific function based on the uttered speech. This speech recognition function has become increasingly common in order to replace a physical input in an electronic device and to control the electronic device with speech.

A service utilizing an electronic device by using an 'intelligent agent' is becoming popular. The intelligent agent (such as Apple's Siri, Samsung's Bixby, Microsoft's Cortana, and Google's Google Assistant) may be based on natural language processing schemes. Thus, the term 'intelligent agent' may be called as 'natural language processing,' 'natural language processing interface,' 'natural language interface,' 'natural language processing database', and 'natural language understanding.'

The intelligent agent may provide integrated functions to a user by controlling various external devices functionally connected to the electronic device. When an electronic device provides a speech-based (or natural language processing based) intelligent agent service, a user of the electronic device can execute various functions of the electronic device by using speech.

As the Internet of Things (IoT), in which devices used in the user's living environment are connected to each other through wired and wireless networks and share information, begins to be applied, an environment in which speech recognition for other external devices connected over a network can be performed using various electronic devices such as televisions or refrigerators is being prepared.

Electronic devices that provide speech-based (or natural language processing based) intelligent agent functions are increasing in a user's living environment. When the user cannot see contents on a screen at the time of checking the result of a speech command after the speech command, there is a limit in that the user mostly has to rely on speech feedback. When the user "requests" speech feedback again, an electronic device may make an unexpected response that does not match the user's intent. When the user receives speech feedback from an electronic device under the same conditions as the previously provided speech feedback, it may be difficult for the user to correctly recognize desired information as before.

SUMMARY

According to an aspect of the disclosure, an electronic device includes: a microphone; a speaker; a memory configured to store parameter information; and a processor configured to: perform speech recognition of a user's speech received by the microphone, control the speaker to output a first response message based on the speech recognition of the user's speech, detect a re-request for the first response message, recognize a text of the first response message, determine a second response message and a first speech signal based on a first parameter corresponding to the text, and generate the second response message comprising the determined first speech signal.

According to another aspect of the disclosure, a method performed by an electronic device, includes: performing speech recognition of a user's speech received by a microphone and outputting a first response message based on the speech recognition of the user's speech; detecting a re-request for the first response message; recognizing a text of the first response message; determining a second response message and a first speech signal based on a first parameter corresponding to the text; and generating the second response message comprising the determined first speech signal.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 7 illustrates a method for providing speech feedback by an electronic device according to an embodiment.

DETAILED DESCRIPTION

Figure 1:
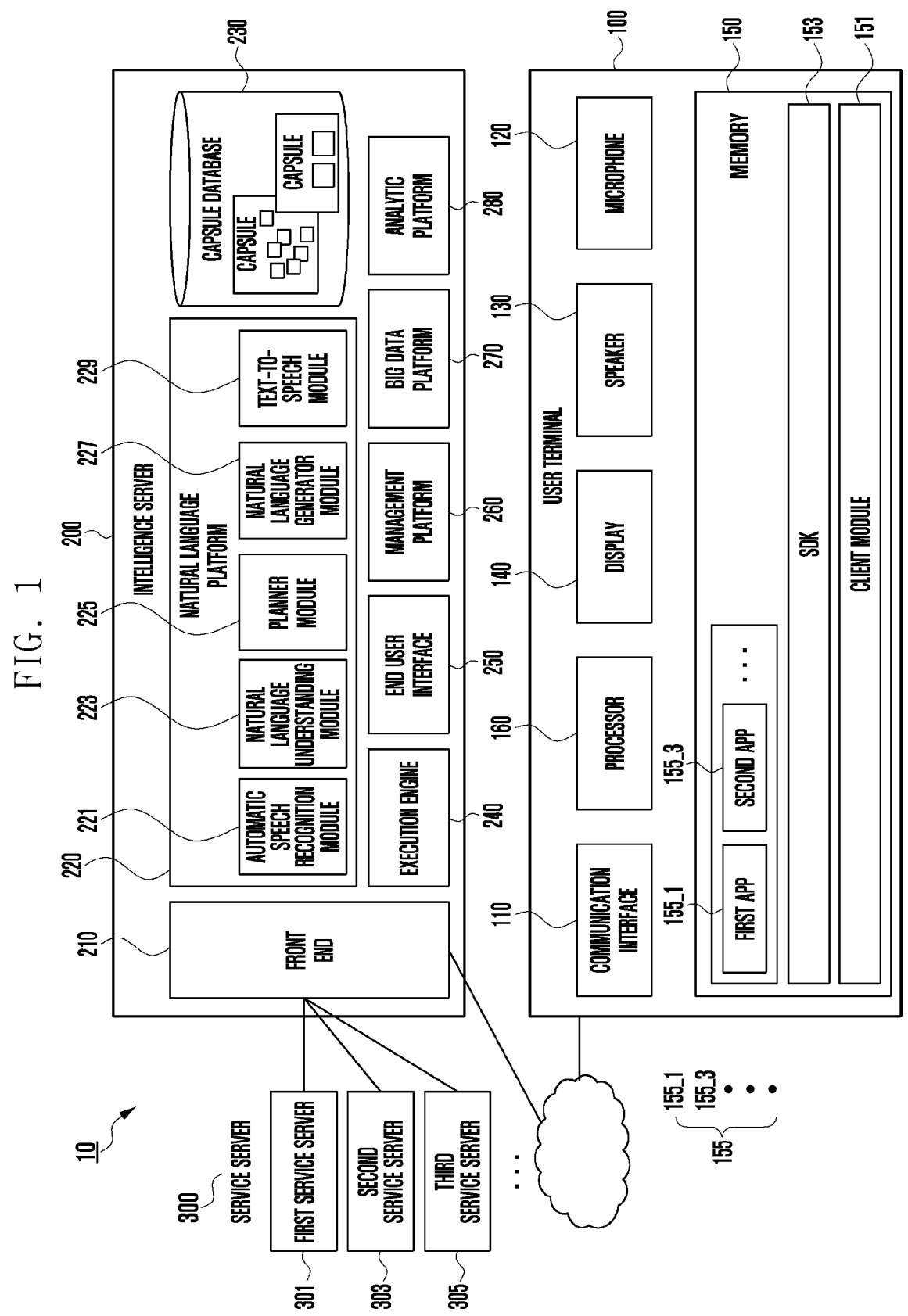
FIG. 1 is a block diagram illustrating an integrated intelligence (AI) system according to an embodiment.

Hereinafter, embodiments of the disclosure will be described in detail with reference to the drawings so as to be capable of being easily implemented by those skilled in the art to which the disclosure belongs. However, the disclosure may be embodied in various different forms and is not limited to the embodiments described herein. In describing the drawings, identical or similar reference numerals may be used for identical or similar elements. Also, in the drawings and related descriptions, descriptions of well-known functions and configurations may be omitted for clarity and conciseness.

FIG. 1 is a block diagram illustrating an integrated intelligence system according to an embodiment.

Referring to FIG. 1, an integrated intelligence system 10 in an embodiment may include a user terminal 100, an intelligent server 200, and a service server 300.

The user terminal 100 according to an embodiment may be a terminal device (or an electronic device) capable of being connected to the Internet, for example, a mobile phone, a smartphone, a personal digital assistant (PDA), a notebook computer, a TV, white goods, a wearable device, an HMD, or a smart speaker.

According to an embodiment, the user terminal 100 (e.g., an electronic device 501 in FIG. 5) may include a communication interface 110, a microphone 120, a speaker 130, a display 140, a memory 150, and a processor 160. The constituent elements listed above may be operatively or electrically connected to each other.

According to an embodiment, the communication interface 110 may be connected to an external device so as to transmit/receive data. According to an embodiment, the microphone 120 may receive a sound (e.g., a user's utterance, verbal communication, talk) and may convert the sound into an electrical signal. According to an embodiment, the speaker 130 may output an electrical signal as sound (e.g., audio). According to an embodiment, the display 140 may be configured to display an image or a video. According to an embodiment, the display 140 may display a graphical user interface (GUI) of an app (or an application program) being executed.

The display 140 in an embodiment may be configured to display an image or a video. The display 140 according to an embodiment may also display a graphical user interface (GUI) of an app (or an application program) being executed. The display 140 according to an embodiment may receive a touch input through a touch sensor. For example, the display 140 may receive a text input through a touch sensor in an on-screen keyboard area displayed within the display 140.

According to an embodiment, the memory 150 may store a client module 151, a software development kit (SDK) 153, and multiple apps 155. The client module 151 and the SDK 153 may constitute a framework (or a solution program) for performing general functions. In addition, the client module 151 or the SDK 153 may constitute a framework for processing a user input (e.g., a speech input, a text input, a touch input).

According to an embodiment, the multiple apps 155 stored in the memory 150 may be a program for performing designated functions. According to an embodiment, the multiple apps 155 may include a first app 155_1 and a second app 155_3. According to an embodiment, each of the multiple apps 155 may include multiple operations for performing a designated function. For example, the multiple apps 155 may include at least one among an alarm app, a message app, and a schedule app. According to an embodiment, the multiple apps 155 may be executed by the processor 160 to sequentially execute at least some of the multiple operations.

According to an embodiment, the processor 160 may control overall operations of the user terminal 100. For example, the processor 160 may be electrically connected to the communication interface 110, the microphone 120, the speaker 130, the display 140, and the memory 150 to perform a designated operation.

According to an embodiment, the processor 160 may also execute a program stored in the memory 150 to perform a designated function. For example, the processor 160 may execute at least one of the client module 151 or the SDK 153 to perform the following operation for processing a user input. The processor 160 may control operations of the multiple apps 155 through the SDK 153, for example. The following operations described as operations of the client module 151 or the SDK 153 may be operations performed by the processor 160.

According to an embodiment, the client module 151 may receive a user input. For example, the client module 151 may generate a speech signal corresponding to a user utterance detected through the microphone 120. Alternatively, the client module 151 may receive a touch input detected through the display 140. Alternatively, the client module 151 may receive a text input detected through a keyboard or an on-screen keyboard. In addition, various types of user inputs detected through an input module included in the user terminal 100 or an input module connected to the user terminal 100 may be received. The client module 151 may transmit the received user input to the intelligent server 200. According to an embodiment, the client module 151 may transmit state information of the user terminal 100 to the intelligent server 200 together with the received user input. The state information may be, for example, execution state information of an app.

According to an embodiment, the client module 151 may receive a result corresponding to the received user input. For example, the client module 151 may receive a result corresponding to a user input from the intelligent server 200. The client module 151 may display the received result on the display 140. In addition, the client module 151 may output the received result as audio through the speaker 130.

According to an embodiment, the client module 151 may receive a plan corresponding to the received user input. The client module 151 may display, on the display 140, a result of executing multiple operations of an app according to the plan. For example, the client module 151 may sequentially display results of execution of the multiple operations on a display and may output audio through the speaker 130. In another example, the user terminal 100 may display only some results of executing the multiple operations (e.g., the result of the last operation) on the display and may output audio through the speaker 130.

According to an embodiment, the client module 151 may receive, from the intelligent server 200, a request for obtaining information necessary for calculating a result corresponding to a user input. The information necessary for calculating the result may be, for example, state information of the user terminal 100. According to an embodiment, the client module 151 may transmit the necessary information to the intelligent server 200 in response to the request.

According to an embodiment, the client module 151 may transmit, to the intelligent server 200, information about a result of executing multiple operations according to a plan. The intelligent server 200 may use the result information to identify that the received user input has been properly processed.

According to an embodiment, the client module 151 may include a speech recognition module. According to an embodiment, the client module 151 may recognize a speech input for performing a limited function through the speech recognition module. For example, the client module 151 may execute an intelligent app for processing speech input to perform organic actions through a designated input (e.g., wake up!).

According to an embodiment, the intelligent server 200 may receive information related to a user's speech input from the user terminal 100 through a communication network. According to an embodiment, the intelligent server 200 may change data related to the received speech input into text data. According to an embodiment, the intelligent server 200 may generate, based on the text data, a plan for performing a task corresponding to the user's speech input.

According to an embodiment, the plan may be generated by an artificial intelligent (AI) system. The artificial intelligent system may be a rule-based system, a neural network-based system (e.g., a feedforward neural network (FNN)) or a recurrent neural network (RNN)). Alternatively, the artificial intelligent system may be a combination of the foregoing or an artificial intelligent system different from the forgoing. According to an embodiment, the plan may be selected from a set of predefined plans or may be generated in real time in response to a user request. For example, an artificial intelligent system may select at least one of multiple predefined plans.

According to an embodiment, the intelligent server 200 may transmit a result calculated according to the generated plan to the user terminal 100, or may transmit the generated plan to the user terminal 100. According to an embodiment, the user terminal 100 may display the result calculated according to the plan on a display. According to an embodiment, the user terminal 100 may display, on a display, a result of executing an operation according to the plan.

The intelligent server 200 according to an embodiment may include a front end 210, a natural language platform 220, a capsule database (capsule DB) 230, an execution engine 240, an end user interface 250, a management platform 260, a big data platform 270, and an analytic platform 280.

According to an embodiment, the front end 210 may receive a user input received from the user terminal 100. The front end 210 may transmit a response corresponding to the user input.

According to an embodiment, the natural language platform 220 may include an automatic speech recognition module (ASR module) 221, a natural language understanding (NLU) module 223, a planner module 225, a natural language generator (NLG) module 227, and a text-to-speech (TTS) module 229.

According to an embodiment, the ASR module 221 may convert a speech input received from the user terminal 100 into text data. According to an embodiment, the NLU module 223 may identify the user's intent by using the text data of the speech input. For example, the NLU module 223 may perform syntactic analysis or semantic analysis on a user input in the form of text data to identify the user's intent. According to an embodiment, the NLU module 223 may identify the meaning of a word, extracted from a user input, by using linguistic features (e.g., grammatical elements) of a morpheme or a phrase, and may determine the user's intent by matching the identified meaning of the word to the intent. The NLU module 223 may obtain intent information corresponding to a user utterance. The intent information may be information representing the user's intent determined by interpreting the text data. The intent information may include information indicating an action or a function that the user intends to perform using the device.

According to an embodiment, the planner module 225 may generate a plan by using a parameter and the intent determined by the NLU module 223. According to an embodiment, the planner module 225 may determine, based on the determined intent, multiple domains necessary for performing a task. The planner module 225 may determine multiple actions included in each of the multiple domains determined based on the intent. According to an embodiment, the planner module 225 may determine parameters required to execute the multiple determined actions, or result values output by execution of the multiple actions. The parameters and the result values may be defined as concepts related to a designated format (or class). Accordingly, the plan may include multiple concepts and multiple actions determined by the user's intent. The planner module 225 may determine relationships between the multiple actions and the multiple concepts in stepwise (or hierarchical) manner. For example, the planner module 225 may determine, based on the multiple concepts, an execution order of the multiple actions determined based on the user's intent. In other words, the planner module 225 may determine an execution order of multiple actions, based on parameters necessary for execution of the multiple actions and results output by the execution of the multiple actions. Accordingly, the planner module 225 may generate a plan including relationship information (e.g., ontology) between multiple actions and multiple concepts. The ontology indicates that relationships between all entities can be defined in the form of "subject", "predicate", and "object". The ontology may imply that an electronic device can define relationships between all entities to understand the meaning of all the entities.

The planner module 225 may generate a plan by using information stored in the capsule DB 230 in which a set of relationships between concepts and actions is stored.

According to an embodiment, the NLG module 227 may change designated information into the text form. The information changed to the text form may be in the form of a natural language utterance. The TTS module 229 according to an embodiment may change information in text form into information in speech form.

According to an embodiment, the capsule database 230 may store information on the relationships between multiple concepts and actions corresponding to multiple domains. For example, the capsule database 230 may store multiple capsules containing multiple action objects (or action information) and concept objects (or concept information) of a plan. According to an embodiment, the capsule database 230 may store the multiple capsules in the form of a concept action network (CAN). According to an embodiment, the multiple capsules may be stored in a function registry included in the capsule database 230.

According to an embodiment, the capsule DB 230 may include a strategy registry storing strategic information necessary to determine a plan corresponding to a speech input. The strategic information may include reference information for determining one plan when there are multiple plans corresponding to user input. According to an embodiment, the capsule DB 230 may include a follow-up registry storing follow-up action information for suggesting a follow-up action to a user in a designated situation. The follow-up action may include a follow-up utterance, for example. According to an embodiment, the capsule DB 230 may include a layout registry for storing layout information of information that is output through the user terminal 100.

According to an embodiment, the capsule DB 230 can include a vocabulary registry storing vocabulary information included in capsule information. According to an embodiment, the capsule DB 230 can include a dialog registry storing information on the dialog (or interaction) with the user.

According to an embodiment, the capsule DB 230 may update stored objects through a developer tool. The developer tool may include, for example, a function editor for updating action objects or concept objects. The developer tool may include a vocabulary editor for updating vocabulary. The developer tool may include a strategy editor for producing and registering a strategy for determining a plan. The developer tool may include a dialog editor for producing a dialog with the user. The developer tool may include a follow up editor capable of editing a follow-up utterance for activating follow-up goals and providing hints. The follow-up goals may be determined based on a currently configured goal, a user's preference, or environmental conditions.

According to an embodiment, the capsule DB 230 may also be implemented in the user terminal 100. In other words, the user terminal 100 may include the capsule DB 230 that stores information for determining an action corresponding to a speech input.

According to an embodiment, an execution engine 240 may calculate a result by using the generated plan. According to an embodiment, an end user interface 250 may transmit the calculated result to the user terminal 100. Accordingly, the user terminal 100 may receive the result and may provide the received result to the user. According to an embodiment, a management platform 260 may manage information used in the intelligent server 200. According to an embodiment, a big data platform 270 may collect user data. According to an embodiment, an analysis platform 280 may manage quality of service (QoS) of the intelligent server 200. For example, the analysis platform 280 may manage the constituent elements and processing speed (or efficiency) of the intelligent server 200.

According to an embodiment, the service server 300 may provide a designated service (e.g., food order or hotel reservation) to the user terminal 100. According to an embodiment, the service server 300 may be a server operated by a third party. For example, the service server 300 may include a first service server 301, a second service server 303, and a third service server 305 operated by different third parties. According to an embodiment, the service server 300 may provide the intelligent server 200 with information for generating a plan corresponding to a received user input. The provided information may be stored in the capsule DB 230, for example. In addition, the service server 300 may provide result information according to the plan to the intelligent server 200.

In the integrated intelligence system 10 described above, the user terminal 100 may provide various intelligent services to the user in response to a user input. The user input may include, for example, an input using a physical button, a touch input, or a speech input.

According to an embodiment, the user terminal 100 may provide a speech recognition service through an internally stored intelligent app (or speech recognition app). In this case, for example, the user terminal 100 may recognize a user's utterance or speech input (voice input) received through a microphone, and may provide a service corresponding to the recognized speech input to the user.

According to an embodiment, the user terminal 100 may perform, based on the received speech input, a designated operation alone or together with the intelligent server and/or service server. For example, the user terminal 100 may execute an app corresponding to the received speech input and may perform a designated operation through the executed app.

According to an embodiment, when the user terminal 100 provides a service together with the intelligent server 200 and/or the service server 300, the user terminal 100 may detect a user utterance by using the microphone 120 and may generate a signal (or audio data) corresponding to the detected user utterance. The user terminal 100 may transmit the audio data to the intelligent server 200 by using the communication interface 110.

According to an embodiment, in response to the speech input received from the user terminal 100, the intelligent server 200 may generate a plan for performing a task corresponding to the speech input or a result of performing an action according to the plan. The plan may include, for example, multiple actions for performing a task corresponding to a user's speech input, and multiple concepts related to the multiple actions. The concepts may define parameters input for the execution of the multiple actions or result values output by the execution of the multiple actions. The plan may include information about the relationships between the multiple actions and the multiple concepts.

The user terminal 100 according to an embodiment may receive the response by using the communication interface 110. The user terminal 100 may output a speech signal generated inside the user terminal 100 to the outside by using the speaker 130, or may output an image generated inside the user terminal 100 to the outside by using the display 140.

Figure 2:
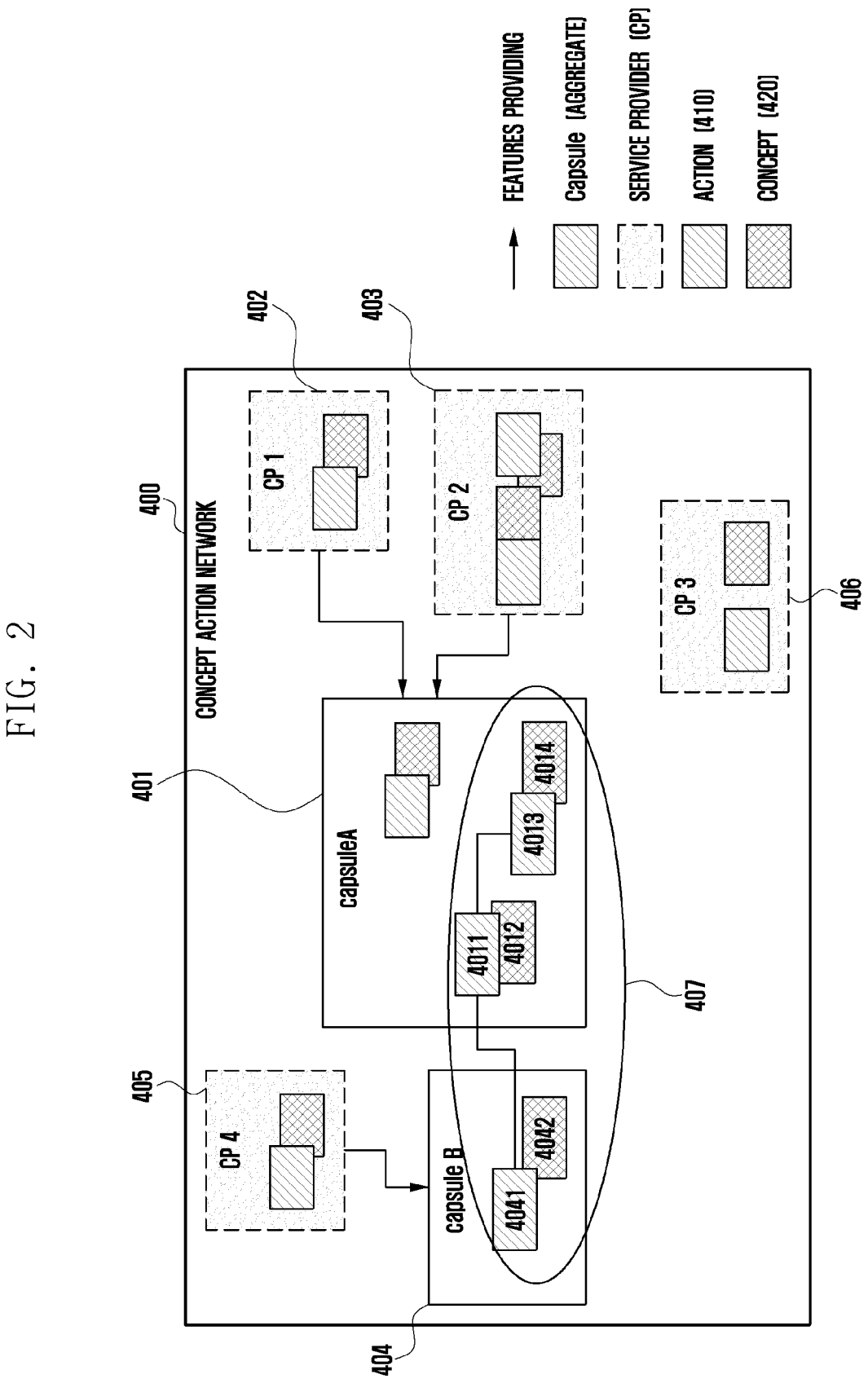
FIG. 2 illustrates a form in which information about the relationship between a concept and an action is stored in a database according to an embodiment.

FIG. 2 illustrates a form in which information about the relationship between a concept and an action is stored in a database according to one or more embodiments.

A capsule database (e.g., the capsule DB 230 in FIG. 1) of the intelligent server (e.g., the intelligent server 200 in FIG. 1) may store multiple capsules in the form of a concept action network (CAN) 400. The capsule database may store an action for processing a task corresponding to a user's speech input and a parameter necessary for the action in the form of a concept action network (CAN). The CAN may represent an organic relationship between an action and a concept defining a parameter necessary to perform the action.

The capsule database may store multiple capsules (e.g., Capsule A 401 and Capsule B 404) each corresponding to multiple domains (e.g., applications). According to an embodiment, one capsule (e.g., Capsule A 401) may correspond to one domain (e.g., an application). In addition, one capsule may correspond to at least one service provider (e.g., CP 1 402, CP 2 403, CP 3 405, or CP 4 406) for performing functions of a domain related to the capsule. According to an embodiment, one capsule may include at least one action 410 and at least one concept 420 for performing a designated function.

According to an embodiment, a natural language platform (e.g., the natural language platform 220 in FIG. 1) may generate a plan for performing a task corresponding to a received speech input by using a capsule stored in the capsule database. For example, a planner module (e.g., the planner module 225 in FIG. 1) of the natural language platform may generate a plan by using a capsule stored in the capsule database. For example, a plan 407 may be generated by using actions 4011 and 4013 and concepts 4012 and 4014 of Capsule A 401, and an action 4041 and a concept 4042 of Capsule B 404.

Figure 3:
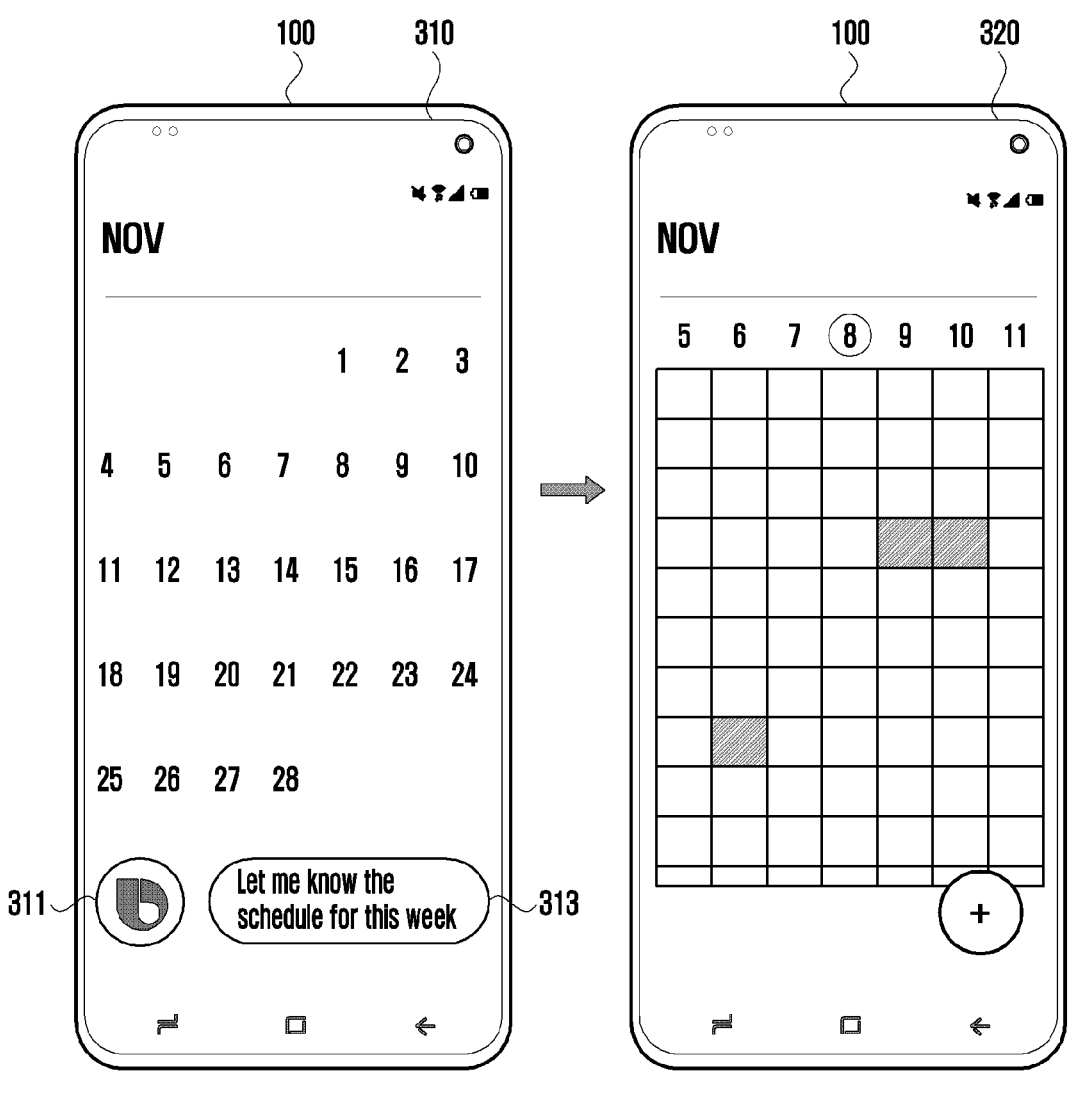
FIG. 3 illustrates a screen in which a user terminal processes a received speech input through an intelligent application according to an embodiment.

FIG. 3 illustrates a screen in which a user terminal processes a received speech input through an intelligent application according to an embodiment.

The user terminal 100 may execute an intelligent app to process a user input through an intelligent server (e.g., the intelligent server 200 in FIG. 1).

According to an embodiment, in screen 310, when recognizing a designated speech input (e.g., wake up!) or receiving an input through a hardware key (e.g., a dedicated hardware key), the user terminal 100 may execute an intelligent app for processing the speech input. The user terminal 100 may, for example, execute an intelligent app while a schedule app is being executed. According to an embodiment, the user terminal 100 may display an object (e.g., an icon) 311 corresponding to an intelligent app on a display (e.g., the display 140 in FIG. 1). According to an embodiment, the user terminal 100 may receive speech input by a user's utterance. For example, the user terminal 100 may receive a speech input saying "Tell me this week's schedule!". According to an embodiment, the user terminal 100 may display, on the display, a user interface (UI) 313 (e.g., an input window) of an intelligent app in which text data of the received speech input is displayed.

According to an embodiment, on screen 320, the user terminal 100 may display a result corresponding to the received speech input on the display 140. For example, the user terminal 100 may receive a plan corresponding to the received user input and may display "this week's schedule" on the display 140 according to the plan.

Figure 4:
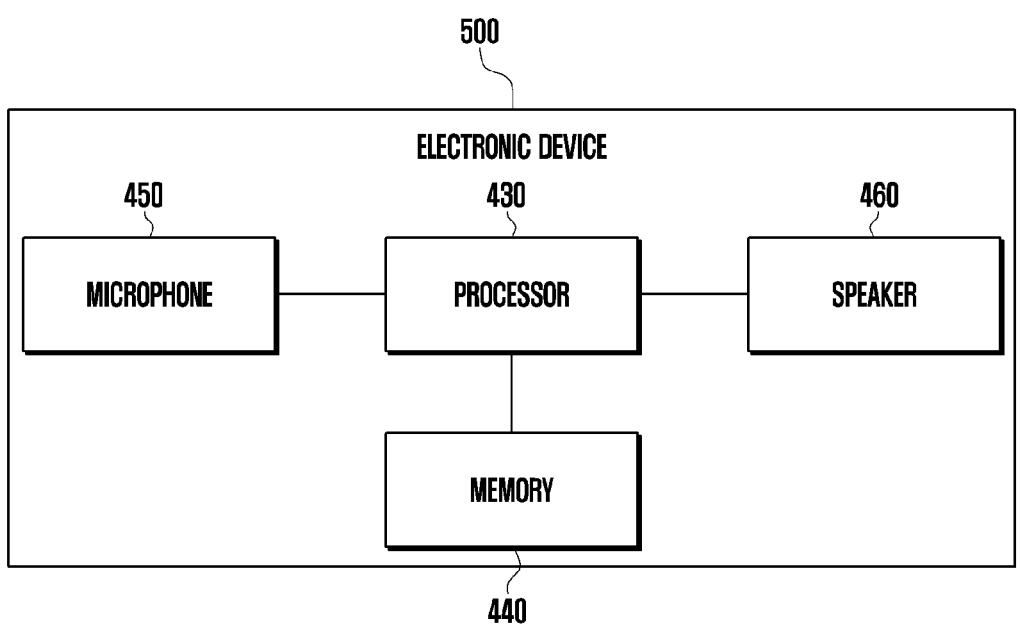
FIG. 4 illustrates a configuration of an electronic device according to an embodiment.

FIG. 4 illustrates a configuration of an electronic device 500 according to an embodiment.

Figure 5:
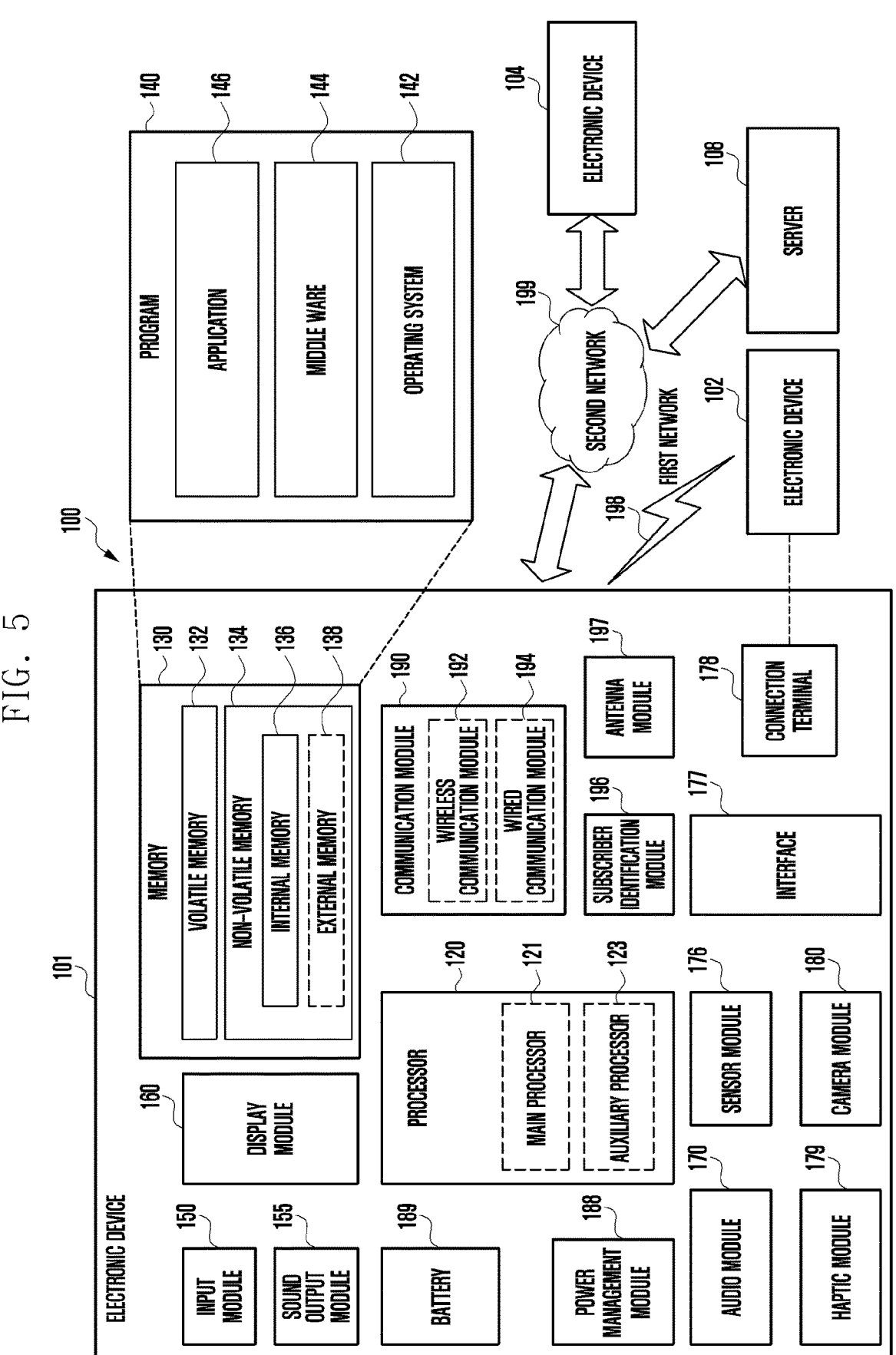
FIG. 5 is a block diagram of an electronic device in a network environment, according to one or more embodiments.

In an embodiment, the electronic device 500 (e.g., the electronic device 501 in FIG. 5) may include a microphone 450 (e.g., the input module 550 in FIG. 5), a speaker 460 (e.g., the sound output module 555 in FIG. 5), a processor 430 (e.g., the processor 520 in FIG. 5), and a memory 440 (e.g., the memory 530 in FIG. 5).

In an embodiment, the microphone 450 may receive sound from the outside and generating a signal corresponding to the input sound. Specifically, the microphone 450 may receive a user speech (a user's speech) and generate a user speech signal corresponding to the user speech.

Also, the microphone 450 may receive noise generated around the electronic device 500 and generate a signal corresponding to the input noise. The microphone 450 may include a variety of elements such as a microphone for collecting analog sound (user speech or ambient noise), an amplifier circuit for amplifying the collected user speech, an A/D conversion circuit for sampling the amplified user speech and converting the sampled user speech into a digital signal, and a filter circuit for removing a noise component from the digital signal.

An element for receiving sound may be implemented as a microphone, but this is only an example, and thus the element may be implemented as an input terminal capable of receiving a sound signal.

In an embodiment, the speaker 460 may output various notification sounds or voice messages as well as various audio data on which processing such as decoding has been performed by the processor 430. The speaker 460 may amplify the output of various notification sounds or voice messages.

In particular, the speaker 460 may output response information about user speech in the form of a sound voice message in natural language. Alternatively, when the electronic device 500 detects ambient noise and summarizes response information about user speech, the speaker 460 may output the summarized response information in the form of a voice message in natural language.

An element for outputting audio may be implemented as a speaker, but this is only an embodiment, and thus the element may be implemented as an output terminal capable of outputting audio data.

In an embodiment, the processor 430 may be electrically or operatively connected to the memory 440 so as to control overall operations and functions of the electronic device 500. For example, the processor 430 may drive an operating system or an application program (e.g., the program 540 in FIG. 5) to control hardware or software elements connected to the processor 430 and to perform various types of data processing and calculations. In addition, the processor 430 may load and process commands or data received from at least one of the other elements in a volatile memory (e.g., the volatile memory 532 in FIG. 5), and may stores various pieces of data in a non-volatile memory (e.g., non-volatile memory 534 in FIG. 5).

To this end, the processor 430 may be implemented as a dedicated processor (e.g., an embedded processor) for performing a corresponding operation or a general-purpose processor (e.g., a central processing unit (CPU)) or an application processor (AP)) capable of performing corresponding operations by executing one or more software programs stored in a memory device.

In the disclosure, the processor 430 may be implemented as a digital signal processor (DSP) for processing a digital signal, a microprocessor, or a time controller (TCON). However, the disclosure is not limited thereto, and the processor 430 may include one or more among a central processing unit (CPU), a micro controller unit (MCU), a micro processing unit MPU), a controller, an application processor (AP)), a graphics processing unit (GPU), a communication processor (CP), or an address resolution protocol (ARP) processor, or may be defined by the corresponding term. In addition, the processor 430 may be implemented as a system on chip (SoC) having a built-in processing algorithm or a large-scale integration (LSI), or may be implemented as a field-programmable gate array (FPGA).

In an embodiment, the processor 430 may detect user speech, uttered by a user, through the microphone 450. Specifically, the processor 430 may receive a signal of user speech input through the microphone 450 to detect the user speech.

In an embodiment, the processor 430 may perform speech recognition of the user speech and may control the speaker 460 to output information corresponding to the speech recognition result. In the disclosure, the information corresponding to the speech recognition result may be information about a response to a query included in the user speech. That is, when the user speech includes a request for specific information, the information corresponding to the speech recognition result may be response information for the specific information included in the user speech.

The processor 430 may detect noise around the electronic device 500 during a series of processes of receiving user speech, performing speech recognition of the user speech, and outputting information corresponding to the speech recognition result.

Specifically, the processor 430 may identify noise around the electronic device 500 by using the microphone 450. The processor 430 may receive a sound signal generated around the electronic device 500 through the microphone 450 and may identify noise in the received sound signal.

In an embodiment, the processor 430 may identify the type of ambient noise by analyzing the frequency of a signal corresponding to the ambient noise. For example, the processor 430 may perform frequency analysis by extracting characteristics such as an amplitude and a period of an ambient noise signal from received sound, thereby identifying the type of ambient noise. The processor 430 may identify whether the ambient noise corresponds to another user's speech, corresponds to sound generated by another electronic device, or corresponds to a sound, generated in situations that require immediate action from the user, such as a baby crying sound or a window breaking sound.

In another embodiment, the processor 430 may identify the type of ambient noise by using an artificial intelligence model. Specifically, the processor 430 may identify the type of noise around the electronic device 500 by using an artificial intelligence model trained to identify the type of sound. To this end, the electronic device 500 may include an artificial intelligence model trained to receive a sound input through the microphone 450 and identify the type of noise.

In an embodiment, the processor 430 may change, based on the identified type of noise, an output state of the information corresponding to the speech recognition result. For example, the changing of the output state of the information may include stopping output of the information corresponding to the speech recognition result. The changing of the output state of the information may include summarizing and outputting the information corresponding to the speech recognition result. The changing of the output state of the information may include outputting a sound including a specific word relatively loud compared with a sound including another word. The changing of the output state of the information may include outputting information about noise instead of the information corresponding to the speech recognition result.

In an embodiment, the memory 440 is an element for storing various types of programs and data necessary for the operation of the electronic device 500.

In an embodiment, the memory 440 may be implemented as an internal memory such as ROM (e.g., electrically erasable programmable read only memory (EEPROM)) or RAM included in the processor 430, or may be implemented as a memory separate from the processor 430. In this case, the memory 440 may be implemented in the form of a memory embedded in the electronic device 500 or in the form of a removable memory in the electronic device 500 according to a data storage purpose. For example, data for driving the electronic device 500 may be stored in a memory embedded in the electronic device 500, and data for extended functions of the electronic device 500 may be stored in a removable memory of the electronic device 500.

In an embodiment, the memory 440 may include an NLG abstraction module that summarizes response information generated as a result of user speech recognition and generated through a natural language generator (NLG) module. The NLG abstraction module may extract a keyword from the response information generated through an NLG module of a dialog system, and may generate summary information by summarizing the response information based on the extracted keyword.

To this end, keyword information for each domain may be pre-stored in the memory 440. In the disclosure, a domain refers to a field related to user speech or response information for the user speech. For example, when a user utters "How's the weather today?", a domain for the user's uttered speech may be "weather".

In an embodiment, the memory 440 may store an artificial intelligence model trained to output information of a user' reaction according to the type of noise. In this case, the artificial intelligence model may be re-trained using the type of noise generated by driving the electronic device 500 and/or information about the user's reaction to the noise.

Alternatively, according to an embodiment, the type of noise and/or information about the user's reaction according to the type of noise may be stored. Specifically, information about the user's reaction to a speech recognition result output when noise is generated may be stored in the memory 440 according to the type of noise. For example, if the user amplifies the sound of voice information rather than summarizing a speech recognition result when noise from an external device, such as the sound of a vacuum cleaner, occurs in the process of providing the speech recognition result, the memory 440 may store user reaction information such as "speech recognition result output step-vacuum cleaner sound-sound amplification".

In an embodiment, NLU may be implemented with various types of algorithms including a rule-based or statistical-based algorism. If it is necessary to process commands that are not applied to the rules or models of a used algorithm or that require separate processing, the processor 430 may separately recognize and preprocess the commands before processing the NLU. For example, a user-designated instruction (e.g., a quick command) is recognized through sentence matching (e.g., exact matching, Levenshtein distance, or cosine distance) by a designated utterance processor, and when the user-designated instruction is recognized, the processor 430 may sequentially execute commands configured by the user. The user-designated instruction (quick command) is a command generated with a name designated by a user, and may refer to a command that cannot be processed in NLU. Even when it is desired to temporarily designate commands recognizable in NLU so as to perform other functions, the processor 430 may sequentially execute commands set by the user. In another example, in the case of a common command to be commonly processed across all domains, the processor 430 may use the designated utterance processor to process the common command rather than recognizing the common command and designating an action in all the domains. In the disclosure, a domain refers to a field related to user speech or response information for the user speech.

In an embodiment, the designated utterance processor may be processed as one domain according to implementation. The designated speech processing unit may be implemented on the processor 430. When the designated utterance processor is processed as one domain, the one domain may be selected with priority over other domains. The designated utterance processor performs domain classification on one input command and, when processed as one domain, may preferentially select an intent corresponding to the domain.

In an embodiment, the processor 430 may perform a function corresponding to a user request and then convert a message to be delivered to the user into sound. The processor 430 may use a text-to-speech (TTS) function. The processor 430 may generate speech based on a TTS model. The TTS model may be determined differently depending on a used speech synthesis algorithm (e.g., parameter speech synthesis, unit junction speech synthesis, or neural network speech synthesis).

In an embodiment, the processor 430 may include multiple TTS models corresponding to various voices. The processor 430 may include an emotional TTS model for expressing various emotions or an emphasis TTS model for emphasizing vocalization. When a reconfirmation request utterance is recognized, the processor 430 may generate a speech response by using a response to a previous utterance.

The processor 430 may use other TTS models, which have not been used in previous responses, to generate a speech response. Alternatively, the processor 430 may use other synthesis parameters, which have not been used in previous responses, to generate a speech response. For example, the processor 430 may generate waveform-type synthesis in a vocoder by using acoustic frames generated in a decoder. The vocoder is a portmanteau of voice and coder, and may refer to a technology for compressing a pulse code modulation (PCM) signal, which is a digitally converted speech signal. The processor 430 may adjust at least one of multiple features (e.g., pitch, spectrum, cepstrum, duration, and energy) with respect to a section requiring emphasis during operation of the vocoder to apply a feeling of emphasis to a synthesized sound. The cepstrum may be obtained by applying an inverse fast Fourier transform to a spectrum.

FIG. 5 is a block diagram illustrating an electronic device 501 in a network environment 500 according to various embodiments. Referring to FIG. 5, the electronic device 501 in the network environment 500 may communicate with an electronic device 502 via a first network 598 (e.g., a short-range wireless communication network), or at least one of an electronic device 504 or a server 508 via a second network 599 (e.g., a long-range wireless communication network). According to an embodiment, the electronic device 501 may communicate with the electronic device 504 via the server 508. According to an embodiment, the electronic device 501 may include a processor 520, memory 530, an input module 550, a sound output module 555, a display module 560, an audio module 570, a sensor module 576, an interface 577, a connecting terminal 578, a haptic module 579, a camera module 580, a power management module 588, a battery 589, a communication module 590, a subscriber identification module (SIM) 596, or an antenna module 597. In some embodiments, at least one of the components (e.g., the connecting terminal 578) may be omitted from the electronic device 501, or one or more other components may be added in the electronic device 501. In some embodiments, some of the components (e.g., the sensor module 576, the camera module 580, or the antenna module 597) may be implemented as a single component (e.g., the display module 560).

The processor 520 may execute, for example, software (e.g., a program 540) to control at least one other component (e.g., a hardware or software component) of the electronic device 501 coupled with the processor 520, and may perform various data processing or computation. According to one embodiment, as at least part of the data processing or computation, the processor 520 may store a command or data received from another component (e.g., the sensor module 576 or the communication module 590) in volatile memory 532, process the command or the data stored in the volatile memory 532, and store resulting data in non-volatile memory 534. According to an embodiment, the processor 520 may include a main processor 521 (e.g., a central processing unit (CPU) or an application processor (AP)), or an auxiliary processor 523 (e.g., a graphics processing unit (GPU), a neural processing unit (NPU), an image signal processor (ISP), a sensor hub processor, or a communication processor (CP)) that is operable independently from, or in conjunction with, the main processor 521. For example, when the electronic device 501 includes the main processor 521 and the auxiliary processor 523, the auxiliary processor 523 may be adapted to consume less power than the main processor 521, or to be specific to a specified function. The auxiliary processor 523 may be implemented as separate from, or as part of the main processor 521.

The auxiliary processor 523 may control at least some of functions or states related to at least one component (e.g., the display module 560, the sensor module 576, or the communication module 590) among the components of the electronic device 501, instead of the main processor 521 while the main processor 521 is in an inactive (e.g., sleep) state, or together with the main processor 521 while the main processor 521 is in an active state (e.g., executing an application). According to an embodiment, the auxiliary processor 523 (e.g., an image signal processor or a communication processor) may be implemented as part of another component (e.g., the camera module 580 or the communication module 590) functionally related to the auxiliary processor 523. According to an embodiment, the auxiliary processor 523 (e.g., the neural processing unit) may include a hardware structure specified for artificial intelligence model processing. An artificial intelligence model may be generated by machine learning. Such learning may be performed, e.g., by the electronic device 501 where the artificial intelligence is performed or via a separate server (e.g., the server 508). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 530 may store various data used by at least one component (e.g., the processor 520 or the sensor module 576) of the electronic device 501. The various data may include, for example, software (e.g., the program 540) and input data or output data for a command related thereto. The memory 530 may include the volatile memory 532 or the non-volatile memory 534.

The program 540 may be stored in the memory 530 as software, and may include, for example, an operating system (OS) 542, middleware 544, or an application 546.

The input module 550 may receive a command or data to be used by another component (e.g., the processor 520) of the electronic device 501, from the outside (e.g., a user) of the electronic device 501. The input module 550 may include, for example, a microphone, a mouse, a keyboard, a key (e.g., a button), or a digital pen (e.g., a stylus pen).

The sound output module 555 may output sound signals to the outside of the electronic device 501. The sound output module 555 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 560 may visually provide information to the outside (e.g., a user) of the electronic device 501. The display module 560 may include, for example, a display, a hologram device, or a projector and control circuitry to control a corresponding one of the display, hologram device, and projector. According to an embodiment, the display module 560 may include a touch sensor adapted to detect a touch, or a pressure sensor adapted to measure the intensity of force incurred by the touch.

The audio module 570 may convert a sound into an electrical signal and vice versa. According to an embodiment, the audio module 570 may obtain the sound via the input module 550, or output the sound via the sound output module 555 or a headphone of an external electronic device (e.g., an electronic device 502) directly (e.g., wiredly) or wirelessly coupled with the electronic device 501.

The sensor module 576 may detect an operational state (e.g., power or temperature) of the electronic device 501 or an environmental state (e.g., a state of a user) external to the electronic device 501, and then generate an electrical signal or data value corresponding to the detected state. According to an embodiment, the sensor module 576 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 577 may support one or more specified protocols to be used for the electronic device 501 to be coupled with the external electronic device (e.g., the electronic device 502) directly (e.g., wiredly) or wirelessly. According to an embodiment, the interface 577 may include, for example, a high definition multimedia interface (HDMI), a universal serial bus (USB) interface, a secure digital (SD) card interface, or an audio interface.

A connecting terminal 578 may include a connector via which the electronic device 501 may be physically connected with the external electronic device (e.g., the electronic device 502). According to an embodiment, the connecting terminal 578 may include, for example, a HDMI connector, a USB connector, a SD card connector, or an audio connector (e.g., a headphone connector).

The haptic module 579 may convert an electrical signal into a mechanical stimulus (e.g., a vibration or a movement) or electrical stimulus which may be recognized by a user via his tactile sensation or kinesthetic sensation. According to an embodiment, the haptic module 579 may include, for example, a motor, a piezoelectric element, or an electric stimulator.

The camera module 580 may capture a still image or moving images. According to an embodiment, the camera module 580 may include one or more lenses, image sensors, image signal processors, or flashes.

The power management module 588 may manage power supplied to the electronic device 501. According to one embodiment, the power management module 588 may be implemented as at least part of, for example, a power management integrated circuit (PMIC).

The battery 589 may supply power to at least one component of the electronic device 501. According to an embodiment, the battery 589 may include, for example, a primary cell which is not rechargeable, a secondary cell which is rechargeable, or a fuel cell.

The communication module 590 may support establishing a direct (e.g., wired) communication channel or a wireless communication channel between the electronic device 501 and the external electronic device (e.g., the electronic device 502, the electronic device 504, or the server 508) and performing communication via the established communication channel. The communication module 590 may include one or more communication processors that are operable independently from the processor 520 (e.g., the application processor (AP)) and supports a direct (e.g., wired) communication or a wireless communication. According to an embodiment, the communication module 590 may include a wireless communication module 592 (e.g., a cellular communication module, a short-range wireless communication module, or a global navigation satellite system (GNSS) communication module) or a wired communication module 594 (e.g., a local area network (LAN) communication module or a power line communication (PLC) module). A corresponding one of these communication modules may communicate with the external electronic device via the first network 598 (e.g., a short-range communication network, such as Bluetooth™, wireless-fidelity (Wi-Fi) direct, or infrared data association (IrDA)) or the second network 599 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 592 may identify and authenticate the electronic device 501 in a communication network, such as the first network 598 or the second network 599, using subscriber information (e.g., international mobile subscriber identity (IMSI)) stored in the subscriber identification module 596.

The wireless communication module 592 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 592 may support a high-frequency band (e.g., the mmWave band) to achieve, e.g., a high data transmission rate. The wireless communication module 592 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 592 may support various requirements specified in the electronic device 501, an external electronic device (e.g., the electronic device 504), or a network system (e.g., the second network 599). According to an embodiment, the wireless communication module 592 may support a peak data rate (e.g., 20 Gbps or more) for implementing eMBB, loss coverage (e.g., 564 dB or less) for implementing mMTC, or U-plane latency (e.g., 0.5 ms or less for each of downlink (DL) and uplink (UL), or a round trip of 5 ms or less) for implementing URLLC.

The antenna module 597 may transmit or receive a signal or power to or from the outside (e.g., the external electronic device) of the electronic device 501. According to an embodiment, the antenna module 597 may include an antenna including a radiating element composed of a conductive material or a conductive pattern formed in or on a substrate (e.g., a printed circuit board (PCB)). According to an embodiment, the antenna module 597 may include a plurality of antennas (e.g., array antennas). In such a case, at least one antenna appropriate for a communication scheme used in the communication network, such as the first network 598 or the second network 599, may be selected, for example, by the communication module 590 (e.g., the wireless communication module 592) from the plurality of antennas. The signal or the power may then be transmitted or received between the communication module 590 and the external electronic device via the selected at least one antenna. According to an embodiment, another component (e.g., a radio frequency integrated circuit (RFIC)) other than the radiating element may be additionally formed as part of the antenna module 597.

According to various embodiments, the antenna module 597 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 501 and the external electronic device 504 via the server 508 coupled with the second network 599. Each of the electronic devices 502 or 504 may be a device of a same type as, or a different type, from the electronic device 501. According to an embodiment, all or some of operations to be executed at the electronic device 501 may be executed at one or more of the external electronic devices 502, 504, or 508. For example, if the electronic device 501 should perform a function or a service automatically, or in response to a request from a user or another device, the electronic device 501, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 501. The electronic device 501 may provide the outcome, with or without further processing of the outcome, as at least part of a reply to the request. To that end, a cloud computing, distributed computing, mobile edge computing (MEC), or client-server computing technology may be used, for example. The electronic device 501 may provide ultra-low-latency services using, e.g., distributed computing or mobile edge computing. In another embodiment, the external electronic device 504 may include an internet-of-things (IoT) device. The server 508 may be an intelligent server using machine learning and/or a neural network. According to an embodiment, the external electronic device 504 or the server 508 may be included in the second network 599. The electronic device 501 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "5st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 540) including one or more instructions that are stored in a storage medium (e.g., internal memory 536 or external memory 538) that is readable by a machine (e.g., the electronic device 501). For example, a processor (e.g., the processor 520) of the machine (e.g., the electronic device 501) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 6A:
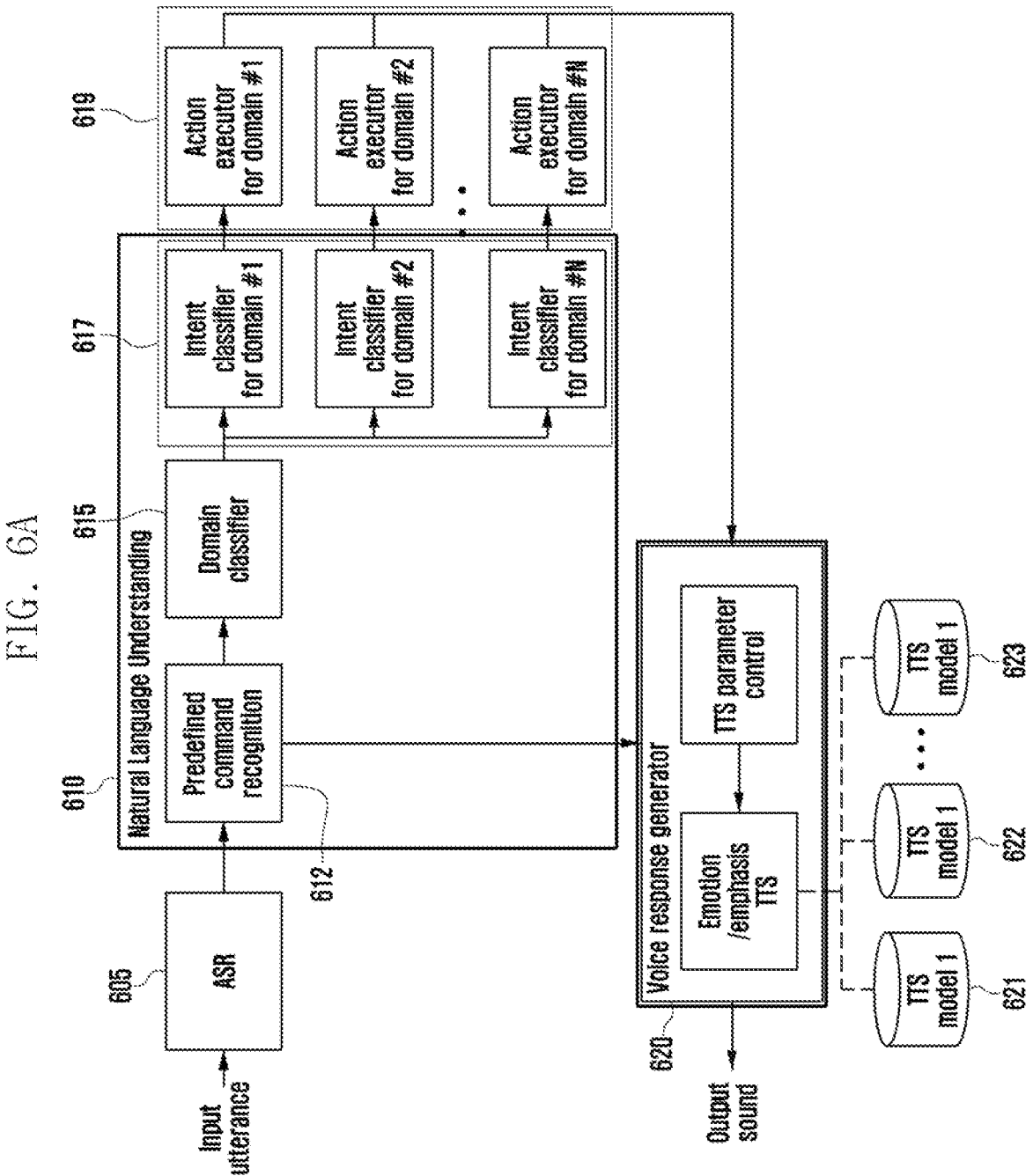
FIG. 6A illustrates the configuration of a designated utterance processor for natural language processing according to an embodiment.

FIG. 6A shows the configuration of a designated utterance processor for natural language processing according to an embodiment.

In an embodiment, an automatic speech recognizer (automatic speech recognition (ASR)) 605 may recognize speech, convert the speech into text, and transmit the text to a NLU controller 610.

NLU may be implemented with various types of algorithms including a rule-based or statistical-based algorithm. A designated utterance processor (predefined command recognition) 612 within the NLU controller 610 may separately recognize and preprocess a command, which is not applied to a used algorithm model or requires separate processing, before NLU. For example, the designated utterance processor 612 may recognize a user-designated instruction (e.g., a quick command) generated with a name designated by a user through sentence matching (e.g., exact matching, Levenshtein distance, or cosine distance), and may sequentially perform commands configured by the user.

Also, with respect to an instruction which is desired to be temporarily designated to perform a different function from the designated function, the instruction to perform the different function may be temporarily designated by one designated utterance processor 612 rather than a common command is not recognized and designated in all domains. The designated utterance processor 612 may use one module to process an instruction that is to be processed on each domain.

The NLU controller 610 may include the designated utterance processor 612, a domain classifier 615, a domain-specific intent classifier 617, and a domain-specific action executor 619. The NLU controller 610 may determine an utterance intent for each domain by using the domain classifier 615, the domain-specific intent classifier 617, and the domain-specific action executor. The utterance intent may be a user's intent (e.g., alarm setting or alarm release) determined by a speech recognition action.

The designated utterance processor 612 may be processed as one domain. In this case, one domain may have priority over other domains. For example, as a result of domain classification for one user command, when a first domain corresponding to the designated utterance processor 612 and a separate second domain are detected, the processor (e.g., the processor 430 in FIG. 4) may preferentially select an intent corresponding to the first domain rather than an intent corresponding to the second domain. The designated utterance processor 612 may preferentially recognize the intent corresponding to the first domain and transmit the recognized intent to a speech response generator 620.

The NLU controller 610 may recognize a reconfirmation-requesting utterance (e.g., "What?", "Tell me again", or "What is the maximum temperature?") among the user's speech inputs. The NLU controller 610 may recognize the reconfirmation-requesting utterance and transmit the reconfirmation-requesting utterance to the speech response generator 620.

According to an embodiment, the speech response generator 620 determines that there is a reconfirmation intent when the reconfirmation-requesting utterance has been input within a designated time (e.g., 3 minutes) after a time point of input of a previous utterance or a time point of a response to the previous utterance. When it is not determined that there is a reconfirmation intent, the speech response generator 620 may generate a designated response (e.g., "It's hard to answer", "This is an incomprehensible command"). According to an embodiment, the designated utterance processor 612 may perform control so that it is possible to recognize a reconfirmation-requesting utterance only within a designated time (e.g., 30 seconds) after a time point of input of a previous utterance or a time point of a response to the previous utterance. The time designated for the response is only an example, and is not limited thereto.

According to an embodiment, when the user speech is not recognized as at least one of designated commands, the designated utterance processor 612 may analyze the input user speech by using either the domain classifier 615 or the domain-specific intent classifier 617 of the NLU unit. The designated utterance processor 612 may determine an intent of the user speech, based on the analysis result, and may perform an action corresponding to the determined intent.

The speech response generator 620 may generate a corresponding response based on the reconfirmation request utterance received from the NLU controller 610. The speech response generator 620 may use a text-to-speech (TTS) algorithm to convert a message to be transmitted to the user into sound. The text-to-speech (TTS) algorithm will be described with reference to FIG. 6B. The speech response generator 620 may generate speech based on a TTS model, and the TTS model may vary according to text-to-speech algorithms (e.g., parameter speech synthesis, unit junction speech synthesis, and neural network speech synthesis). The speech response generator 620 may include multiple TTS models 621, 622, and 623 corresponding to a variety of voices or speech.

In an embodiment, the speech response generator 620 may include an emotional TTS model for expressing various emotions and/or an emphasis TTS model for generating emphatic vocalizations. The speech response generator 620 may recognize the reconfirmation request utterance received from the NLU controller 610 and may generate a speech response by using a response to a previous utterance. Alternatively, the speech response generator 620 may generate a speech response by using a synthesis parameter separate from a response to a previous utterance. A process of generating a response by using a separate synthesis parameter will be described with reference to FIG. 6B.

Figure 6B:
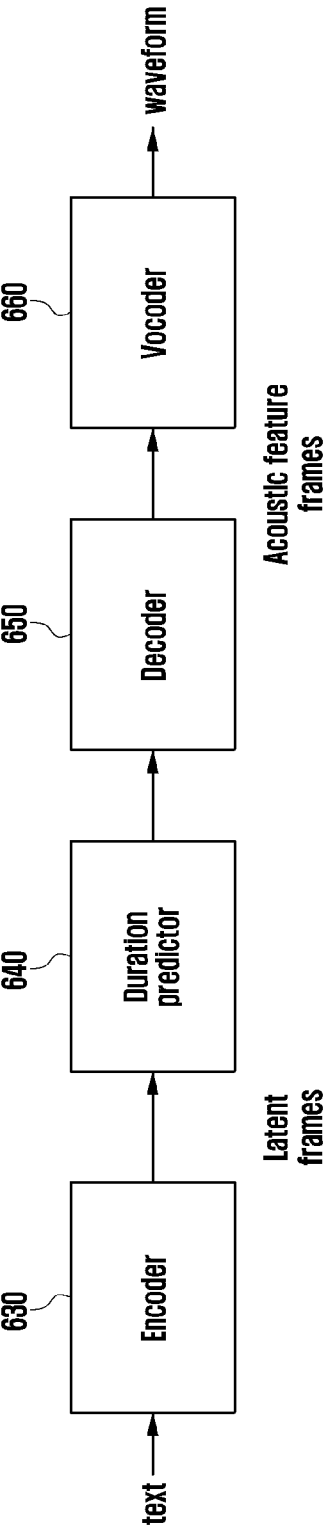
FIG. 6B is a block diagram illustrating a text-to-speech (TTS) algorithm according to an embodiment.

FIG. 6B is a block diagram illustrating a text-to-speech (TTS) algorithm according to an embodiment.

In an embodiment, an encoder 630 may generate multiple latent vectors or latent frames based on input text. A duration encoder 640 may predict the duration of each phoneme based on the multiple latent vectors or latent frames. Alternatively, the duration encoder 640 may regenerate latent vectors or latent frames such that each phoneme has a duration of a predetermined level. A latent vector may refer to a vector-type variable which one image or data has. A latent vector or latent frame may be used to determine a latent space of observation data. The latent space may be relatively small compared with the actual observation space. A deep-learning learning model may increase efficiency by learning only specific features in the latent space in learning the observation data. A decoder 650 may generate acoustic frames necessary for synthesis by using at least one of the generated latent vectors or latent frames. The decoder 650 may insert an emotion flag in the form of embedding and generate synthesized speech according to an emotion. A vocoder 660 may generate synthetic sound in the form of a waveform by using the acoustic frames generated by the decoder 650. The vocoder 660 may determine sections requiring emphasis in the synthetic sound, and may apply a feeling of emphasis to the synthesized sound by using at least one of synthetic features (e.g., pitch, spectrum, cepstrum, duration, or energy) in the determined sections.

FIG. 7 is a flowchart illustrating a method for providing speech feedback by an electronic device according to an embodiment.

Operations described through FIG. 7 may be implemented based on instructions that may be stored in a computer recording medium or a memory (e.g., the memory 530 in FIG. 5). The illustrated method 700 may be performed by the electronic device (e.g., the electronic device 501 in FIG. 5) described above with reference to FIGS. 1 to 6, and the technical features described above will be omitted below. The order of each operation in FIG. 7 may be changed, some operations may be omitted, and some operations may be performed in parallel.

In operation 710, when a user's uttered speech is detected through a microphone (e.g., the microphone 450 in FIG. 4), a processor (e.g., the processor 430 in FIG. 4) may perform speech recognition of the user's uttered speech to output a first response message corresponding to a result of the speech recognition.

In operation 720, the processor 430 may detect a request to re-output (repeat outputting) the first response message in the speech recognition result. Alternatively, a designated utterance processor (predefined command recognition) may detect a request to re-output (repeat outputting) the first response message in the speech recognition result. The first response message may refer to an output message provided in response to a user request before receiving the request to re-output (repeat outputting). In an embodiment, the speech recognition operation may be performed by a domain classifier (e.g., the domain classifier 615 in FIG. 6A) and a domain-specific intent classifier (e.g., the domain-specific intent determiner 617 in FIG. 6A) in a NLU controller (e.g., the NLU controller 610 in FIG. 6A). A domain-specific action executor (e.g., the domain-specific action executor 619 in FIG. 6A may generate response text by using the user's intent (e.g., alarm setting or alarm release) or a parameter (e.g., alarm time, the number of repetitions, or alarm sound) determined by the speech recognition operation. The first response message may be generated by performing text-to-speech (TTS) on the generated response text based on synthesis parameters (e.g., pitch, spectrum, cepstrum, duration, or energy). In an embodiment, the processor 430 may receive the user's speech feedback such as "What?" or "Tell me again". The processor 430 may specifically receive speech feedback, which designates a specific item, such as "What is OO?" or "Say OO again." The processor 430 may provide multiple response methods by using an AI agent (or an intelligent agent) in response to the user's speech feedback.

For example, the processor 430 may reproduce the first response message or the previous speech feedback again. In an embodiment, the processor 430 may generate a second response message by performing text-to-speech (TTS) on the response text, which has been generated for the previous user's uttered speech, based on a second synthesis parameter that is different from a first synthesis parameter. The processor 430 may adjust the volume of the response messages according to circumstances and then provide the response messages to the user. The processor 430 may emphasize and output a part of speech feedback corresponding to a specific tag. The processor 430 may determine an emotional expression corresponding to at least one word in the first response message, and may generate the second response message based on the at least one word and the emotional expression. The second response message may refer to a response message generated in response to the user's request for a request for re-output (repeat outputting). The second response message may include at least a part of the first response message. Alternatively, the second response message may have the same content as the first response message, differing only in the volume.

In operation 730, the processor 430 may determine at least one word, which is to be included in the second response message, based on at least one parameter corresponding to at least one word constituting the first response message. In an embodiment, the processor 430 may emphasize and express important information in the entire content in response to a "re-request" for voice feedback. The processor 430 may determine the at least one word by using a designated parameter in the first response message. The processor 430 may emphasize the determined word based on a tag near the designated parameter and output the emphasized word by a speaker (e.g., the speaker 460 in FIG. 2). For example, a tag may be operatively linked to a variable phrase part. The processor 430 may more clearly transmit the content of the message to the user by emphasizing a part of the speech feedback content.

According to an embodiment, the domain-specific action executor 619 may select the following phrase as a dialog template for "Tell me today's weather".

{speech ("It is expected that today #{displayLocation} is #{conditionAnd}, with the minimum temperature of #{MinTemp} and the maximum temperature of #{MaxTemp}. Fine dust is #{fineDustLevel}. #{description}.")}

In an embodiment, the dialog template may include a fixed phrase part and a variable phrase part. The fixed phrase part may imply a part that is not changed depending on the request situation, such as "today", "the minimum temperature", "the maximum temperature", or "It is expected that". The variable phrase part may imply a part that can be changed depending on the surrounding situation, such as "#{displayLocation}", "#{MinTemp}", or "#{MaxTemp}". The action executor 619 may determine a value corresponding to the variable phrase part, based on information collected from the electronic device (e.g., the electronic device 501 in FIG. 5) and an external server or an internal database. For example, the action executor 619 may determine #{displayLocation} is "Seoul", #{MinTemp} is "24 degrees", and #{MaxTemp} is "29 degrees". The action executor may generate response text by using the determined variable phrase part (e.g., "It is expected that today Seoul is overcast and cloudy with the minimum temperature of 24 degrees and the maximum temperature of 29 degrees).

In an embodiment, the domain-specific action executor 619 may use a dialog template for a previous utterance to generate the second response message corresponding to the user's re-request. The domain-specific action executor 619 may synthesize speech by applying an emphasis synthesis parameter to a variable phrase of the dialog template.

In another embodiment, the domain-specific action executor 619 may not apply an emphasis synthesis parameter to some of multiple variable phrases. For example, when some of the multiple variable phrase parts match words or phrases included in an input utterance, the domain-specific action executor 619 may determine that the some variable phrase parts is information already known to the user and may not apply the emphasis synthesis parameter thereto.

The processor 430 may determine a word or a phrase, which is to be emphasized, in a received dialog by using a parameter. The dialog may refer to a conversation (or speech) history between a user and an intelligent agent. The parameter may refer to a parameter in programming. The parameter may refer to a word generated and output based on specific information (e.g., time, place, maximum temperature, or minimum temperature). For example, when the user speech expression is "What is the highest temperature?", a parameter may be the "highest temperature". For example, when the user speech expression is "What time is it now?", a parameter may be "time". This is only an example, and the type of parameter is not limited thereto.

For example, when the user requests weather information, the processor 430 may construct a response message by using at least one of date, minimum temperature, maximum temperature, fine dust concentration, or precipitation. When the user requests weather information, the processor 430 may determine to emphasize, based on at least one parameter of date, minimum temperature, maximum temperature, fine dust concentration, or precipitation, an element corresponding to the parameter. Alternatively, the processor 430 may determine to include, based on a parameter, only an element corresponding to the parameter in the response message.

In operation 740, the processor 430 may generate the second response message including an emphasis tone for the at least one determined word. In an embodiment, the processor 430 may include the at least one determined word in the response message. In an embodiment, the processor 430 may generate the response message emphasizing the at least one determined word. The second response message may include an emphasis tone for the at least one word determined in the first response message. The second response message may refer to a response message generated in response to the user's request for re-output (repeat outputting). The processor 430 may determine whether to emphasize a certain word by using a tag. The tag may refer to a keyword or classification given as metadata to certain information. A tag may be located before or after a parameter in the dialog template. In an embodiment, the processor 430 may recognize a tag near a parameter, and may emphasize, based on the tag, a word corresponding to the parameter and output the word.

In an embodiment, the processor 430 may determine at least one word by using a designated parameter in the first response message. The processor 430 may determine an emotional expression corresponding to the at least one determined word. The processor 430 may generate the second response message based on the at least one determined word and the determined emotional expression. The processor 430 may determine, based on the emotional expression, either the tone or the utterance speed of the second response message. When providing speech feedback, the processor 430 may more realistically express the content to be transmitted through the emotional expression. An operation for the emotional expression will be described with reference to FIG. 8B.

Figure 8A:
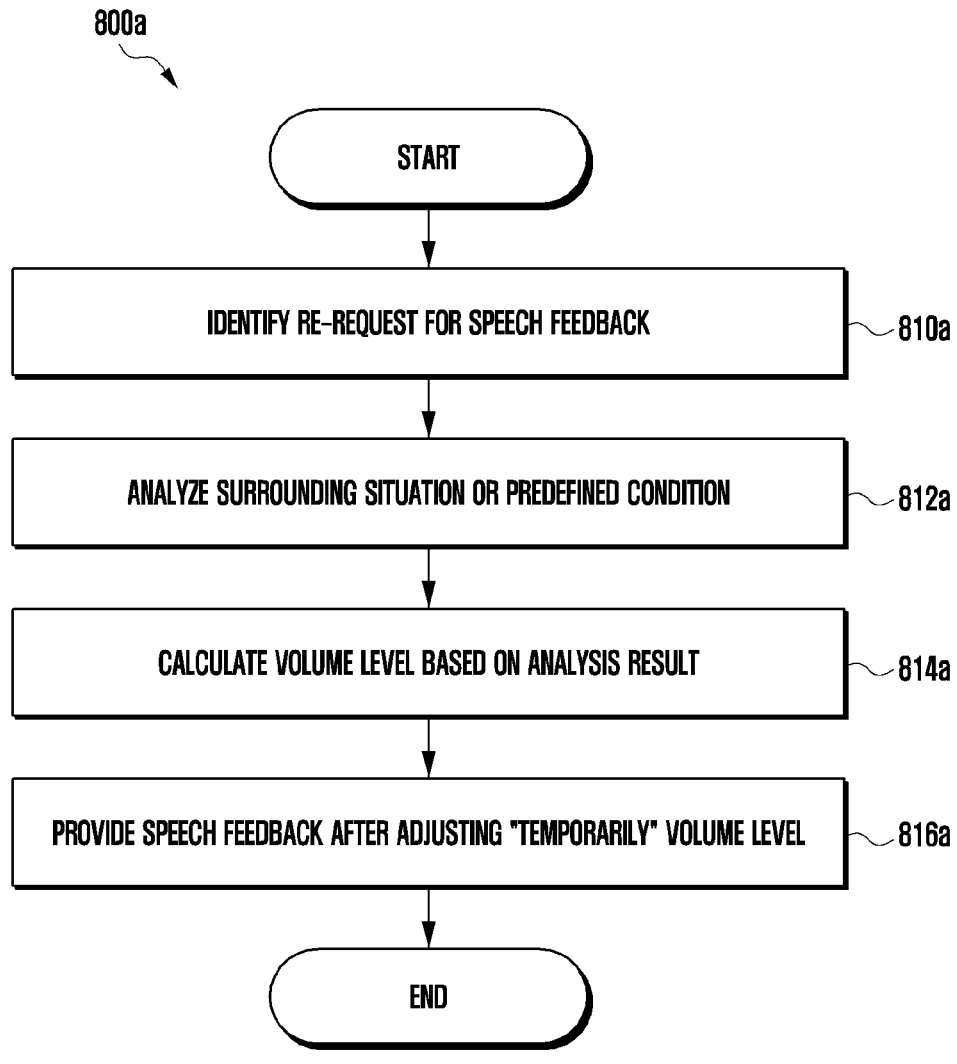
FIGS. 8A and 8B illustrate methods of providing speech feedback by an electronic device according to an embodiment.
Figure 8B:
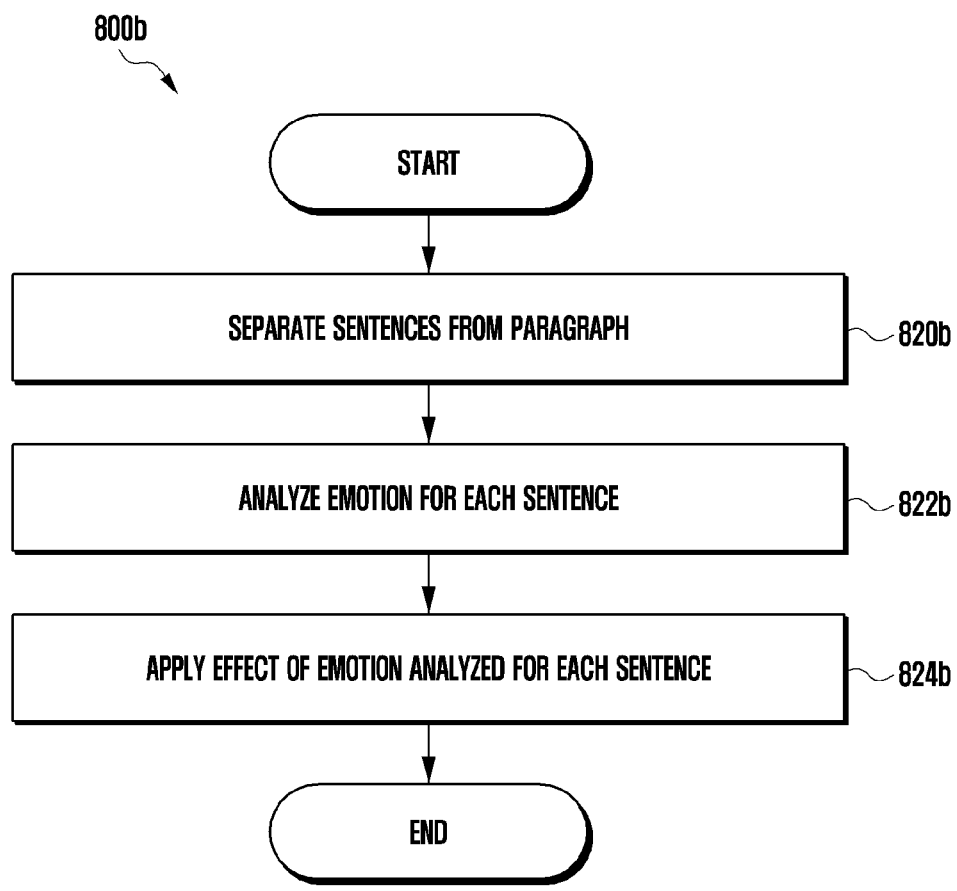

FIGS. 8A and 8B are flowcharts illustrating a method of providing speech feedback by an electronic device according to an embodiment.

Operations described through FIGS. 8A and 8B may be implemented based on instructions that may be stored in a computer recording medium or a memory (e.g., the memory 530 in FIG. 5). The illustrated methods 800a and 800b may be performed by the electronic device (e.g., the electronic device 501 in FIG. 5) described above with reference to FIGS. 1 to 6, and the technical features described above will be omitted below. The order of each operation in FIGS. 8A and 8B may be changed, some operations may be omitted, and some operations may be performed in parallel.

In an embodiment, a processor (e.g., the processor 430 in FIG. 4) may identify noise around the electronic device 500 by using a microphone (e.g., the microphone 450 in FIG. 4), and may change, based on the type of identified noise, an output state of information corresponding to a result of speech recognition.

In operation 810a, the processor 430 may identify a user's re-request for speech feedback.

In operation 812a, the processor 430 may analyze a surrounding situation or a predefined condition. Most of the cases where the user "re-requests" speech feedback may be the case in which the speech feedback is not properly delivered due to external factors such as a long distance from the user or noise. When the processor 430 provides speech feedback at substantially the same volume as before, the processor 430 may receive a "re-request" for the speech feedback from the user. The processor 430 may provide effective speech feedback by "temporarily" or partially automatically adjusting the volume level according to the surrounding situation or the predefined condition. In an embodiment, the processor 430 may analyze the surrounding situation by using any one of the level of ambient noise, the volume of the user's voice, or information about the distance to the user measured by a sensor.

In operation 814a, the processor 430 may determine the volume level of a second response message, based on the analysis result. The second response message may refer to a response message generated in response to the user's request for re-output (repeat outputting). In an embodiment, the processor 430 may determine the volume level of the second response message, based on the analyzed situation. The volume level of the second response message may be defined in advance or may be differently determined depending on the analyzed situations. For example, when ambient noise exceeds a predetermined level, the processor 430 may make the volume of the second response message relatively larger compared with when the ambient noise is low.

In operation 816a, the processor 430 may provide the second response message with the volume level which has been temporarily or partially adjusted. The processor 430 may provide a response message with the volume temporarily adjusted differently based on the user's re-request for speech feedback. The processor 430 may analyze a current situation of the user based on information about the level of ambient noise, the volume of the user's voice, and/or distance from the user. The processor 430 may temporarily or partially adjust the volume level based on the analyzed current situation of the user. For example, the processor 430 may output a response message with a volume temporarily increased based on the ambient noise exceeding a designated level. Alternatively, the processor 430 may output a response message with the volume temporarily turned down based on the user's voice volume being below the designated level in a situation where loud sound is not allowed (e.g., in a library). According to an embodiment, the processor 430 may output a response message with the volume temporarily adjusted to a high level, based on a determination that the volume of the user's voice of a re-request message (e.g., what?) exceeds the designated level.

In an embodiment, the processor 430 may determine an emotional expression corresponding to at least one word determined based on a parameter in the first response message, and may output the second response message based on the at least one determined word and the determined emotional expression. The second response message may refer to a response message generated in response to the user's request for re-output (repeat outputting).

In an embodiment, when providing speech feedback, the processor 430 may more realistically express content to be transmitted through an emotional expression. The emotional expression may be changed depending on a sentence. When several sentences are consecutive, the processor 430 may distinguish between the sentences from the entire speech feedback paragraph, may analyze the emotion of each sentence, and may apply the effect of emotion to each sentence accordingly. The processor 430 may recognize a specific word in a sentence and may recognize the emotion of a user (speaking person) who uttered the sentence. For example, the processor 430 may recognize the word "calm" in the sentence "It is a calm morning", and in response thereto, may configure the speed of a response message to a designated level or adjust the tone of the response message, thereby applying an emotional effect corresponding to "calm".

In operation 820b, the processor 430 may separate and recognize sentences from a recognized paragraph.

In operation 822b, the processor 430 may analyze an emotion for each separate sentence.

In operation 824b, the processor 430 may apply the effect of emotion analyzed for each sentence to a response message. In an embodiment, the processor 430 may group and process consecutive sentences when the sentences have the same emotion. The processor 430 may provide realistic emotional expressions according to the content of speech feedback when a user "re-requests" the speech feedback. The processor 430 may provide various experiences to the user by providing the realistic emotional expressions. The realistic emotions may include at least one of, for example, angry, bored, content, delighted, or happy. These are only examples, and the types of realistic emotions are not limited thereto.

In an embodiment, when the user requests the speech feedback beyond a predetermined number of times, the processor 430 may provide an emotional change of speech feedback. The processor 430 may generate different types of response speech depending on the number of re-request commands. For example, the processor 430 may generate a response message with a happy or excited tone when the number of re-request commands is equal to or less than a certain level. The processor 430 may generate a response message with a tired or bored tone rather than a happy or excited tone, based on the number of re-request commands exceeding the predetermined level. The number of re-request commands and/or the tone of the response message are not limited thereto, and may vary depending on configurations. The processor 430 may provide the emotional change of the speech feedback, thereby adding an element of fun to a dialog.

According to an embodiment, an electronic device (e.g., the electronic device 500 in FIG. 4) may include a microphone (e.g., the microphone 450 in FIG. 4) configured to receive ambient sound, a speaker (e.g., the speaker 460 in FIG. 4), a memory (e.g., the memory 440 in FIG. 4) configured to store parameter information, and a processor (e.g., the processor 430 in FIG. 4) configured to perform speech recognition of a user's uttered speech when the user's uttered speech is detected through the microphone, and control the speaker to output a first response message corresponding to a result of the speech recognition. The processor 430 may be configured to detect an utterance expression indicating a re-request for the first response message in the speech recognition result, recognize at least one piece of text constituting the first response message, determine, based on at least one parameter corresponding to the text, at least one speech signal to be included in a second response message, and generate the second response message emphasizing the at least one determined speech signal.

According to an embodiment, the second response message may be generated based on a dialog template, the dialog template may include a first area including a phrase or a word which is predetermined and has a fixed content and a second area including a phrase or a word which has a content changeable based on information received from an application, at least one phrase or word in the second area corresponds to at least one parameter, respectively, and the parameter may be generated and output based on a time, a place, a maximum temperature, or a minimum temperature, and may include a maximum temperature, a minimum temperature, an alarm time, the number of alarm repetitions, and an alarm sound.

According to an embodiment, the processor may determine the content of the at least one phrase or word in the second area, based on the information received from the application.

According to an embodiment, the processor may determine, based on at least one parameter included in the speech recognition result, a phrase or a word to be included in the second response message from among the at least one phrase or word in the second area.

According to an embodiment, the processor may analyze the user's uttered speech to recognize at least one speech signal included in the user's uttered speech, may determine at least one parameter corresponding to the at least one recognized speech signal, may determine, based on the at least one determined parameter, a speech signal to be included in the second response message from among speech signals in the first response message, and may generate the second response message which provides an emphasis tone to the at least one determined speech signal.

According to an embodiment, the processor may determine an emotional expression corresponding to the at least one determined speech signal by using a designated parameter in the first response message, and may generate the second response message based on the at least one determined speech signal and the determined emotional expression.

According to an embodiment, the processor may determine either a tone or an output speed of the second response message, based on the number of requests for re-output (repeat outputting) of the first response message.

According to an embodiment, the processor may determine the tone of the second response message as a relatively high tone, based on a determination that the number of requests for re-output (repeating outputting) of the first response message is equal to or less than a predetermined level, and may determine the tone of the second response message as a relatively low tone, based on a determination that the number of requests for re-output (repeating outputting) of the first response message exceeds the predetermined level.

According to an embodiment, the processor may determine the output speed of the second response message to be relatively high, based on a determination that the number of requests for re-output (repeating outputting) of the first response message is equal to or less than a predetermined level, and may determine the output speed of the second response message to be relatively low, based on a determination that the number of requests for re-outputting (repeating outputting) the first response message exceeds the predetermined level.

According to an embodiment, the processor may identify noise around the electronic device by using the microphone, and may change an output state of information corresponding to the speech recognition result, based on either the volume or type of the identified noise.

According to an embodiment, the processor may control at least one speech signal, which does not correspond to a parameter designated in the first response message, not to be included in the second response message.

According to an embodiment, a method for providing speech feedback by an electronic device may include performing speech recognition of a user's uttered speech when the user's uttered speech is detected through a microphone and outputting a first response message corresponding to a result of the speech recognition, detecting an utterance expression indicating a re-request for the first response message in the speech recognition result, recognizing at least one piece of text constituting the first response message and determining, based on at least one parameter corresponding to the text, at least one speech signal to be included in a second response message, and generating the second response message emphasizing the at least one determined speech signal.

An embodiment disclosed in the specification and the drawings merely presents a particular example provided for easily describing the technical matters according to the embodiment of the disclosure and contributing to understanding the embodiment of the disclosure, and does not limit the scope of the embodiment of the disclosure. Therefore, it should be construed that all modifications or modified forms capable of being derived from the technical idea of an embodiment of the disclosure in addition to the embodiment disclosed herein are included in the scope of an embodiment of the disclosure.

What is claimed is:

1. An electronic device comprising:
a microphone;
a speaker;
a processor;
memory configured to store parameter information and instructions which, when executed by the processor, cause the processor to:
receive, by the microphone, a user's speech as a request,
perform speech recognition of the user's speech,
control the speaker to output a first response message based on the speech recognition of the user's speech,
receive, from the user, a re-request for the first response message,
recognize a part of the first response message,
determine a second response message comprising a first speech signal, based on a first parameter corresponding to the part, and
output, to the user, the second response message.

2. The electronic device of claim 1, wherein the instructions, when executed by the processor, further cause the processor to generate the second response message based on a dialog template,
wherein the dialog template comprises:
a first phrase part comprising (i) a predetermined phrase or a predetermined word and (ii) a fixed content, and
a second phrase part comprising a phrase or a word which has a content changeable based on information received from an application,
wherein the phrase or the word of the second phrase part corresponds to a second parameter,
wherein the processor is further configured to generate the second parameter based on at least one of a time, a place, a maximum temperature, or a minimum temperature, and
wherein the generated second parameter comprises at least one of the maximum temperature, the minimum temperature, an alarm time, a number of alarm repetitions, or an alarm sound.

3. The electronic device of claim 2, the instructions, when executed by the processor, further cause the processor to:
determine the phrase or the word of the second phrase part, based on the information received from the application.

4. The electronic device of claim 2, the instructions, when executed by the processor, further cause the processor to:
determine, based on the second parameter, the phrase or the word of the second phrase part, and
insert the determined phrase or the determined word into the second response message.

5. The electronic device of claim 1, the instructions, when executed by the processor, further cause the processor to:
recognize a second speech signal of the user's speech by analyzing the user's speech;
determine a third parameter corresponding to the recognized second speech signal;
determine, based on the determined third parameter, a third speech signal from among speech signals of the first response message; and
wherein the second response message comprises the determined third speech signal and provides an emphasis tone to the determined third speech signal.

6. The electronic device of claim 1, the instructions, when executed by the processor, further cause the processor to:
determine a fourth parameter in the first response message;
determine an emotional expression corresponding to the determined first speech signal by using the fourth parameter in the first response message; and
generate the second response message based on the determined first speech signal and the determined emotional expression.

7. The electronic device of claim 1, the instructions, when executed by the processor, further cause the processor to:
determine either a tone or an output speed of the second response message, based on a number of requests for repeating outputting the first response message.

8. The electronic device of claim 7, the instructions, when executed by the processor, further cause the processor to:

determine the tone of the second response message as a relatively high tone, based on a determination that the number of requests for repeating outputting the first response message is equal to or less than a predetermined level; and determine the tone of the second response message as a relatively low tone, based on the determination that the number of requests for repeating outputting the first response message exceeds the predetermined level.

9. The electronic device of claim 7, the instructions, when executed by the processor, further cause the processor to:

determine the output speed of the second response message to be relatively high, based on a determination that the number of requests for repeating outputting the first response message is equal to or less than a predetermined level; and determine the output speed of the second response message to be relatively low, based on the determination that the number of requests for repeating outputting the first response message exceeds the predetermined level.

10. The electronic device of claim 1, the instructions, when executed by the processor, further cause the processor to:

identify noise around the electronic device by using the microphone; and change an output state of information corresponding to the speech recognition, based on either a volume or a type of the identified noise.

11. The electronic device of claim 1, the instructions, when executed by the processor, further cause the processor to:

control a fourth speech signal, determine a fourth parameter in the first response message;

wherein the fourth speech signal does not correspond to the fourth parameter in the first response message, and wherein the second response message does not comprise the fourth speech signal.

12. The electronic device of claim 1, wherein the instructions, when executed by the processor, further cause the processor to generate the second response message based on a dialog template, and wherein the dialog template comprises:

a first phrase part comprising (i) a predetermined phrase or a predetermined word and (ii) a fixed content, and a second phrase part comprising a phrase or a word which has a content changeable based on information received from an application.

13. A method performed by an electronic device, the method comprising:

receiving a user's speech as a request;

performing speech recognition of the user's speech;

outputting a first response message based on the speech recognition of the user's speech;

receiving, from the user, a re-request for the first response message;

recognizing a part of the first response message;

determining a second response message comprising a first speech signal, based on a first parameter corresponding to the part; and outputting, to the user, the second response message.

14. The method of claim 13, wherein the outputting, to the user, the second response message further comprises generating the second response message based on a dialog template, wherein the dialog template comprises:

a first phrase part comprising a predetermined phrase or a predetermined word which comprises a fixed content, and a second phrase part comprising a phrase or a word which has a content changeable based on information received from an application, and wherein the phrase or the word of the second phrase part corresponds to a second parameter.

15. The method of claim 14, further comprising determining a content of the phrase or the word of the second phrase part, based on the information received from the application.

16. The method of claim 14, further comprising determining, based on the second parameter, a phrase or a word of the second response message based on the phrase or the word of the second phrase part.

17. The method of claim 13, further comprising:

recognize a second speech signal of the user's speech by analyzing the user's speech;

determining a third parameter corresponding to the recognized second speech signal;

determining, based on the determined third parameter, a third speech signal from among signals in the first response message, and inserting the determined third speech signal to the second response message; and generating the second response message which provides an emphasis tone to the determined third speech signal.

18. The method of claim 13, further comprising:

determine a fourth parameter in the first response message;

determining an emotional expression corresponding to the determined first speech signal by using the fourth parameter in the first response message; and generating the second response message based on the at least one of the determined first speech signal and the determined emotional expression.

19. The method of claim 13, further comprising determining either a tone or an output speed of the second response message, based on a number of requests for repeating outputting the first response message.

20. The method of claim 19, wherein the determining of either the tone or the output speed of the second response message, based on the number of requests for repeating outputting of the first response message, comprises:

determining the tone of the second response message as a relatively high tone, based on a determination that the number of requests for repeating outputting the first response message is equal to less than a predetermined level; and determining the tone of the second response message as a relatively low tone, based on the determination that the number of requests for repeating outputting the first response message exceeds the predetermined level.

* * * * *